(12) United States Patent
Zhang et al.

(10) Patent No.: US 12,087,028 B2
(45) Date of Patent: Sep. 10, 2024

(54) LIFTED SEMANTIC GRAPH EMBEDDING FOR OMNIDIRECTIONAL PLACE RECOGNITION

(71) Applicant: Kabushiki Kaisha Toshiba, Tokyo (JP)

(72) Inventors: Chao Zhang, Cambridge (GB); Ignas Budvytis, Cambridge (GB); Stephan Liwicki, Cambridge (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 380 days.

(21) Appl. No.: 17/652,336

(22) Filed: Mar. 1, 2022

(65) Prior Publication Data
US 2023/0118864 A1 Apr. 20, 2023

(30) Foreign Application Priority Data
Oct. 15, 2021 (GB) ...................................... 2114788

(51) Int. Cl.
*G06V 10/26* (2022.01)
*G06V 10/762* (2022.01)
*G06V 20/80* (2022.01)

(52) U.S. Cl.
CPC .......... *G06V 10/26* (2022.01); *G06V 10/7635* (2022.01); *G06V 20/80* (2022.01)

(58) Field of Classification Search
CPC .. G06V 20/30; G06V 10/761; G06V 10/7635; G06V 10/26; G06V 10/82; G06V 20/80; G06V 10/764
See application file for complete search history.

(56) References Cited

U.S. PATENT DOCUMENTS 5,978,505 A * 11/1999 Sutton ........................ G06T 5/20
382/156
6,400,846 B1 * 6/2002 Lin ........................ G06T 7/174
382/241
(Continued)

FOREIGN PATENT DOCUMENTS

CN 112069336 A 12/2020

OTHER PUBLICATIONS

Combined Search and Examination Report issued Mar. 25, 2022, in GB Patent Application No. 2114788.9, 9 pages.
(Continued)

*Primary Examiner* — Congvan Tran
(74) *Attorney, Agent, or Firm* — Oblon, McClelland, Maier & Neustadt, L.L.P.

(57) ABSTRACT

A computer-implemented method for place recognition including: obtaining information identifying an image of a first scene; identifying a plurality of pixel clusters in the image; generating a set of feature vectors associated with the pixel clusters; generating a graph of the scene; adding a first edge between a first node and a second node in response to determining that a first property associated with a first pixel cluster is similar to a second property associated with a second pixel cluster; generating a vector representation of the graph; calculating a measure of similarity between the vector representation of the graph and a reference vector representation associated with a second scene; and determining that the first scene and the second scene are associated with a same place in response to determining that the measure of similarity is less than a threshold.

20 Claims, 12 Drawing Sheets

(56) References Cited

U.S. PATENT DOCUMENTS

| | | | |
|---|---|---|---|
| 7,894,669 B2* | 2/2011 | Gloudemans, II | G06T 7/194 |
| | | | 382/218 |
| 2002/0050988 A1* | 5/2002 | Petrov | G06V 10/10 |
| | | | 345/418 |
| 2022/0189029 A1* | 6/2022 | Mequanint | G06T 7/194 |

OTHER PUBLICATIONS

Xin Kong, et al., "Semantic Graph Based Place Recognition for 3D Point Clouds", IEEE/RSJ International Conference on Intelligent Robots and Systems (IROS), Feb. 2021, 11 pages.

Shiqi Lin, et al. "Topology Aware Object-Level Semantic Mapping Towards More Robust Loop Closure", IEEE Robotics and Automation Letters, vol. 6, Issue 4, Jul. 2021, 2 pages.

Arandjelovic et al., "NetVLAD: CNN architecture for weakly supervised place recognition", 2016, IEEE Conference on Computer Vision and Pattern Recognition (CVPR), 2016, 11 pages, doi: 10.1109/CVPR.2016.572.

Li et al., "Graph Matching Networks for Learning the Similarity of Graph Structured Objects", International Conference on Machine Learning, PMLR, 2019, 18 pages.

Schoenberger et al., "Semantic Visual Localization", arXiv:1712.05773v2, 2018, 21 pages.

\* cited by examiner

LIFTED SEMANTIC GRAPH EMBEDDING FOR OMNIDIRECTIONAL PLACE RECOGNITION

FIELD

Embodiments described herein relate generally to a method & apparatus for place recognition and a method & apparatus for training a graph embedding network for place recognition.

BACKGROUND

Visual place recognition comprises determining a camera's location given its current view. Place recognition is an important problem in computer vision and robotics and is applicable to a wide range of applications including, but not limited to, autonomous driving and augmented reality.

A known approach to visual place recognition is to formulate the problem as an image retrieval task. This approach generally involves extracting features from a captured image. The features of the captured image are then compared to features that have been extracted from images in a reference dataset, where each image in the reference dataset is associated with information identifying the place (e.g. GPS coordinates). In this approach the place associated with the captured image is obtaining by determining, based on the extracted features, which image in the reference dataset is most visually similar to the captured image.

Visual feature-based approaches for place recognition generally struggle with appearance changes between the captured image and an associated image in the reference dataset. These changes could be due to illumination and appearance changes (e.g. due to annual seasonal variation), as well as viewpoint variations between the captured image and the reference image. In light of this, a new approach to visual place recognition is required.

Figure 1A:
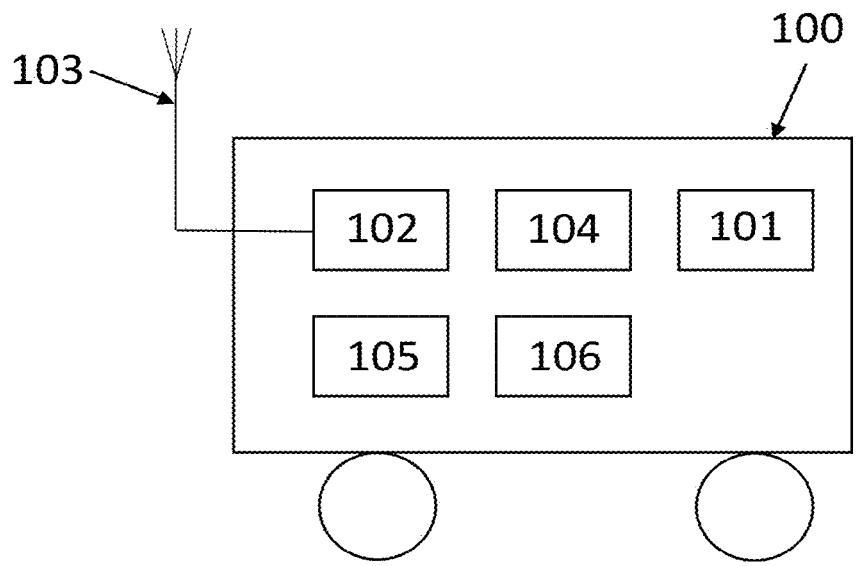
Figure 1B:
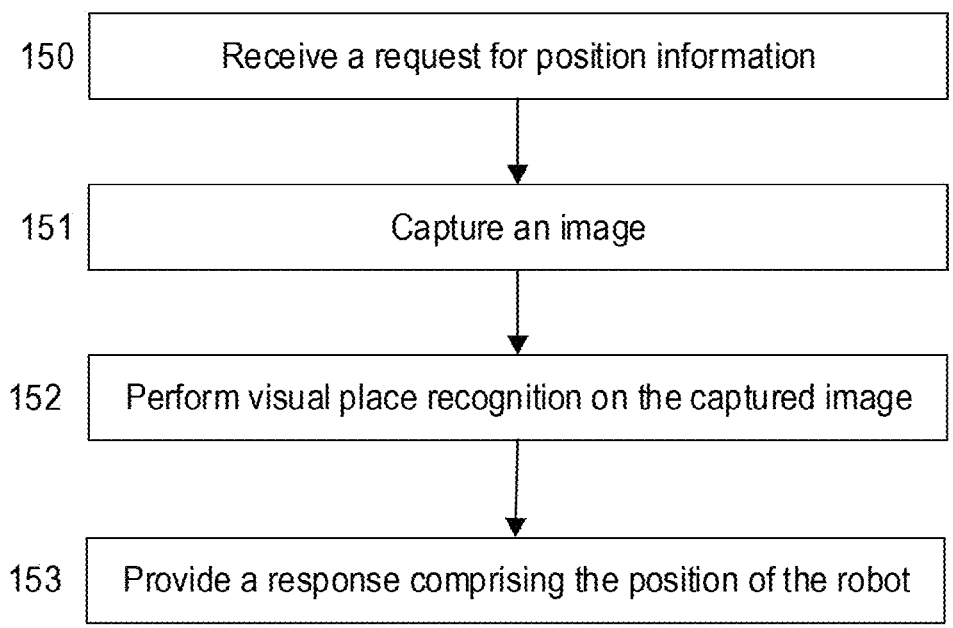
Figure 2:
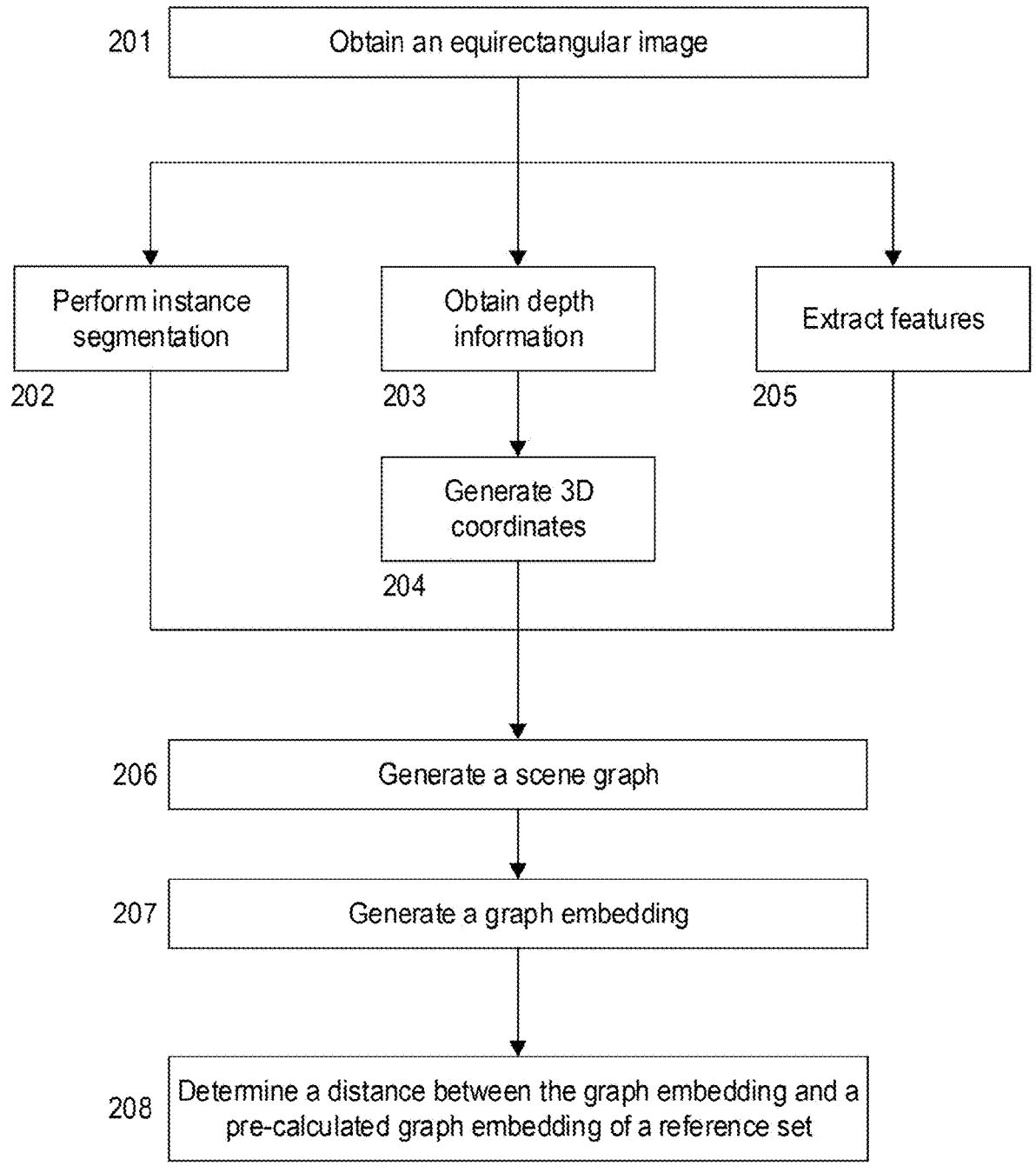
Figure 3:
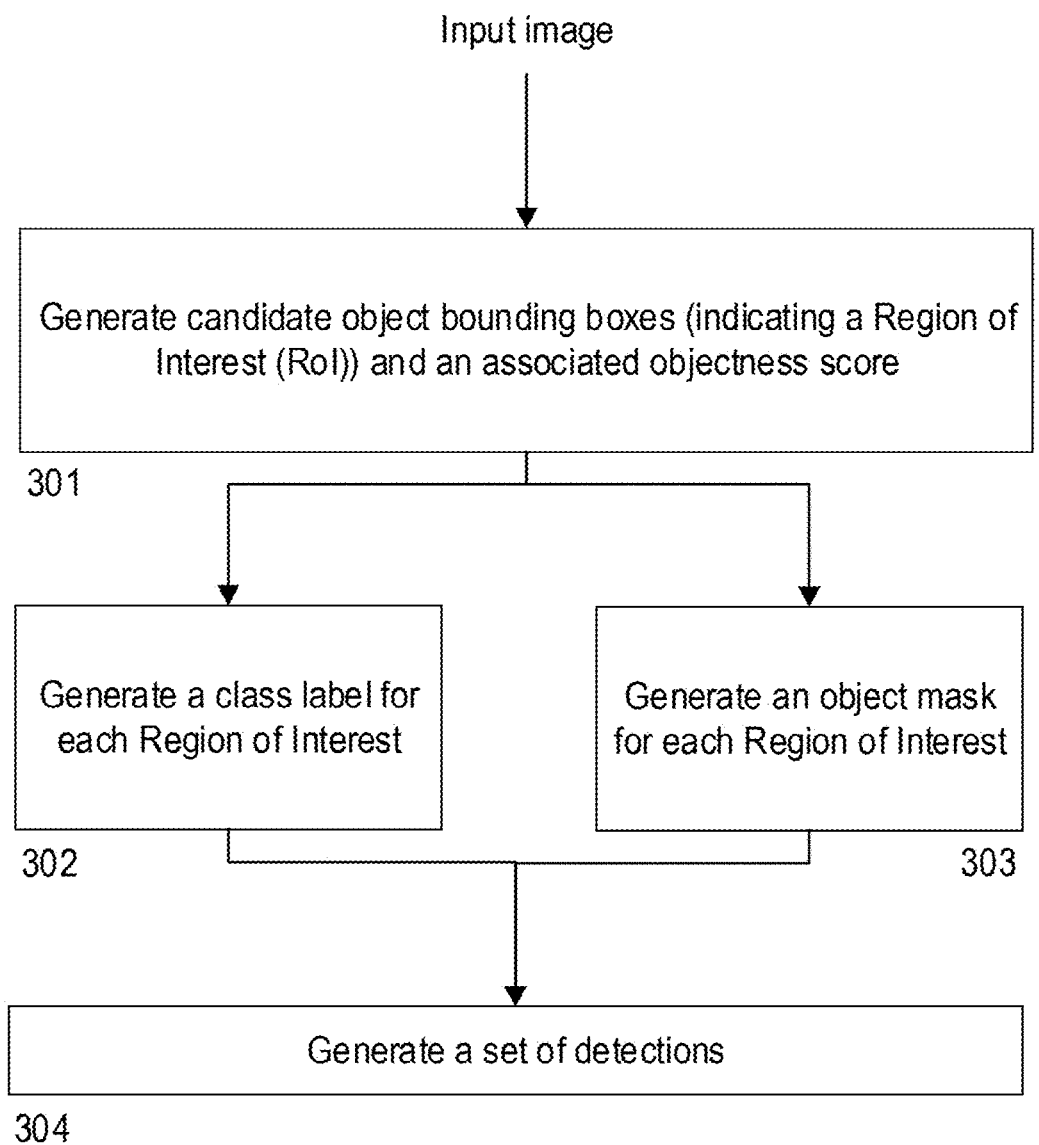
Figure 4:
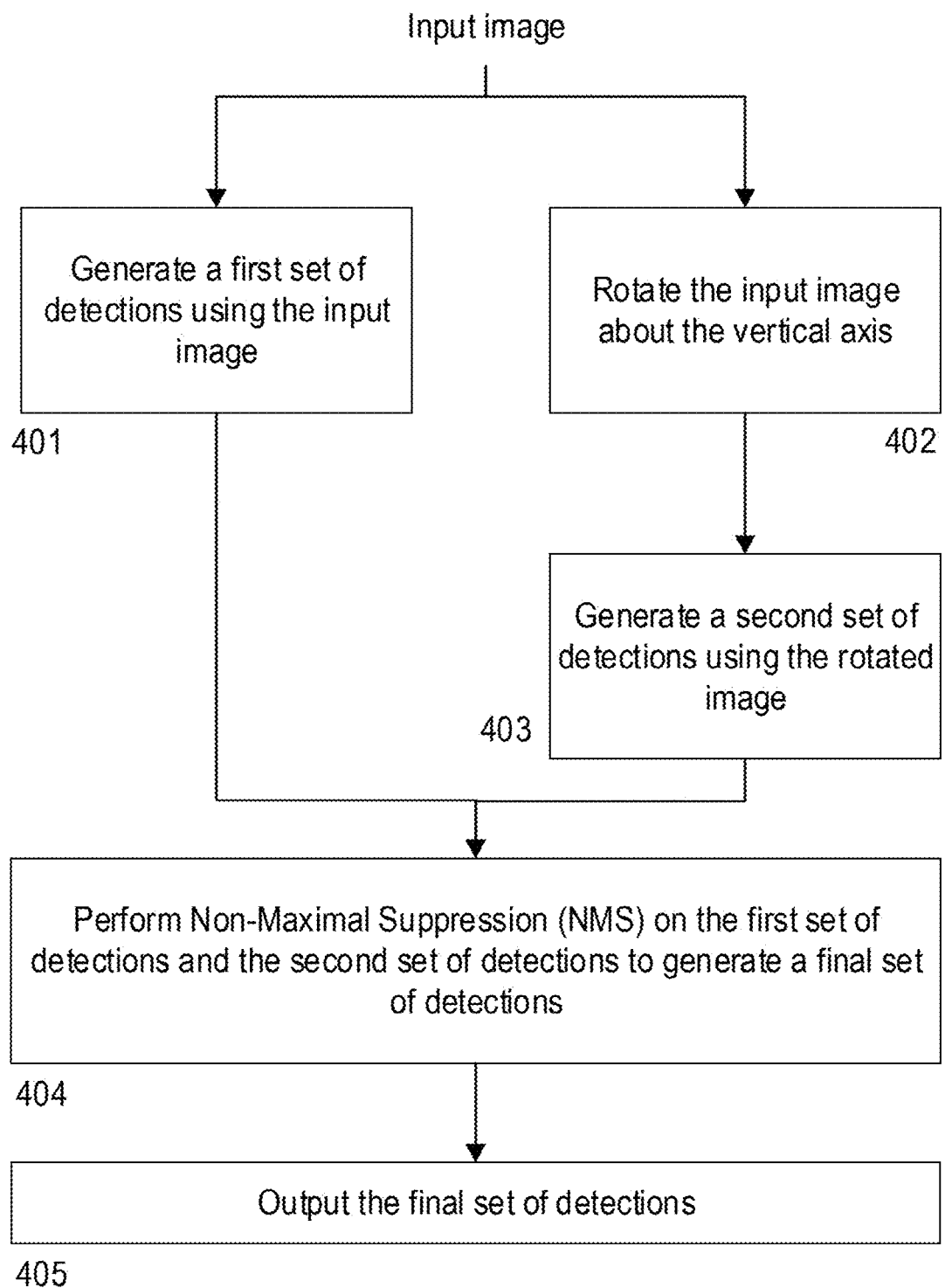
Figure 5A:
Figure 5B:
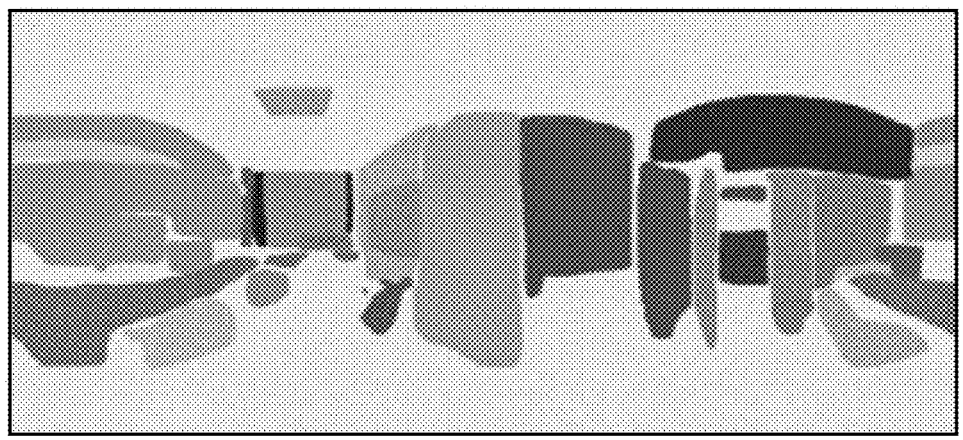
Figure 5C:
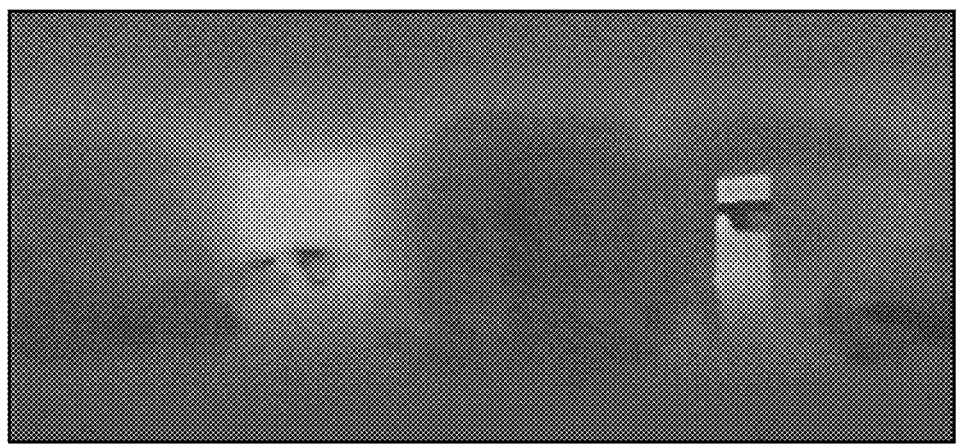
Figure 6A:
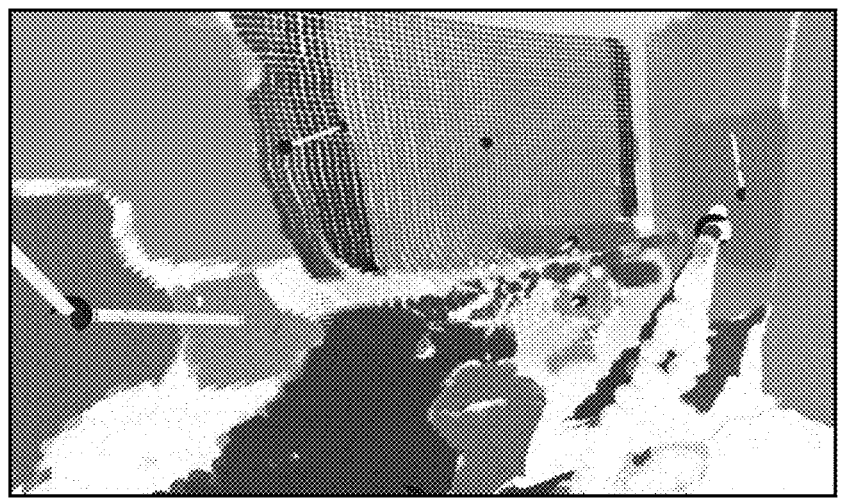
Figure 6B:
Figure 6B:
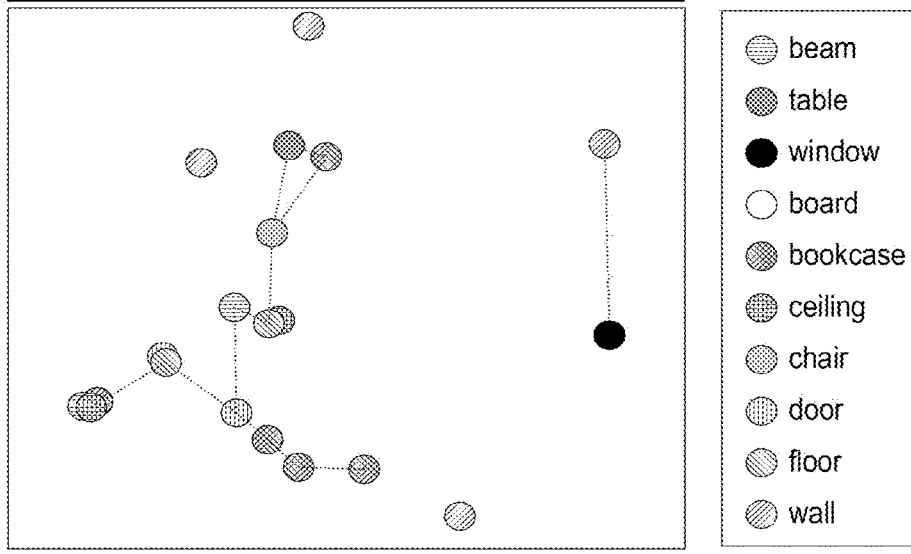
Figure 7:
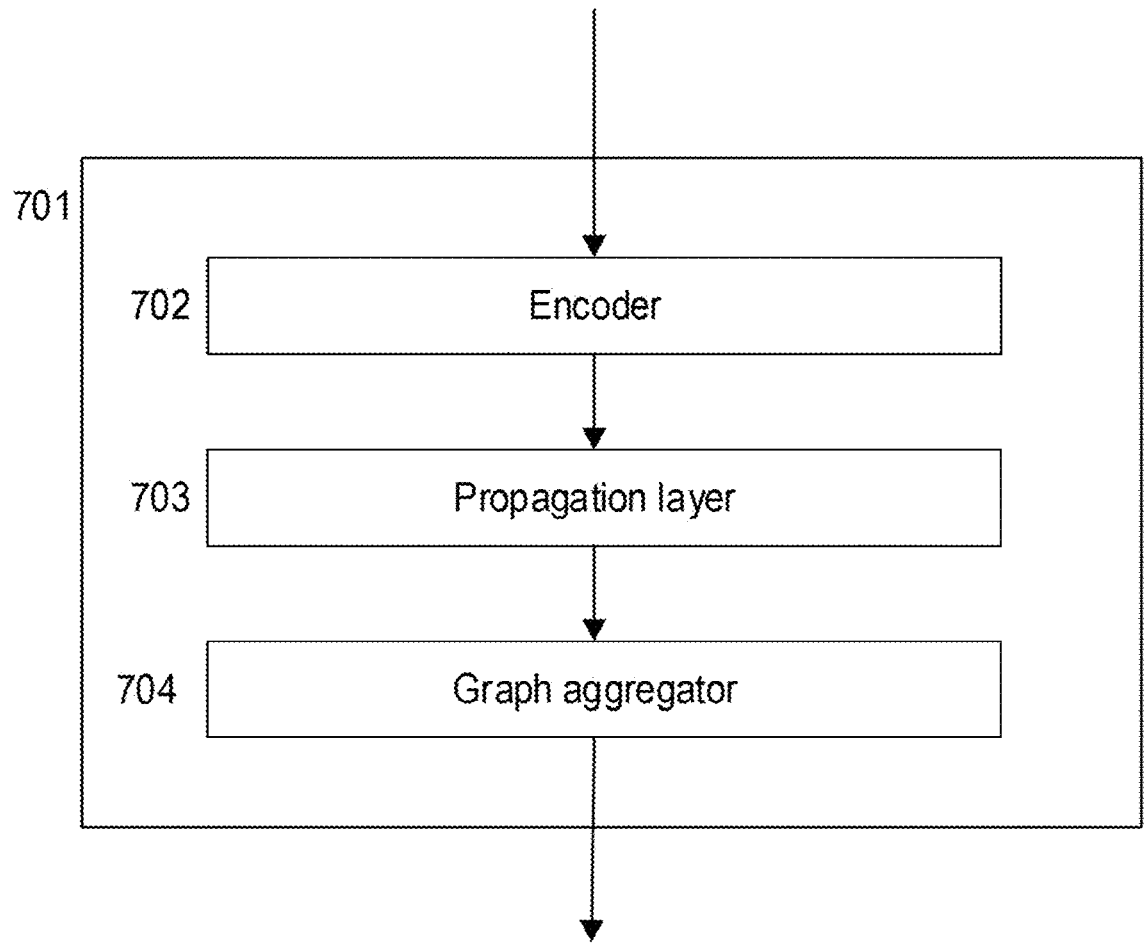
Figure 8:
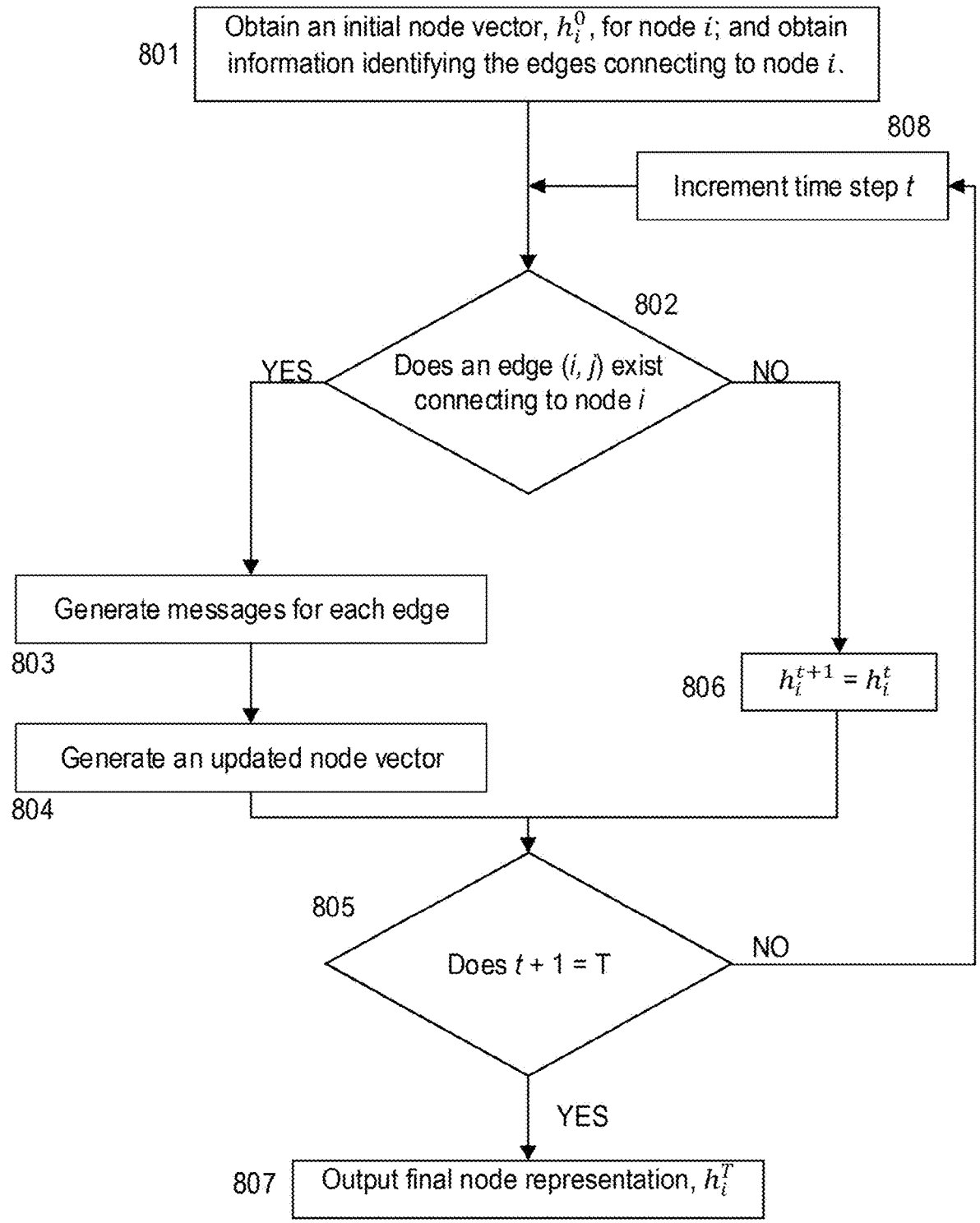
Figure 9:
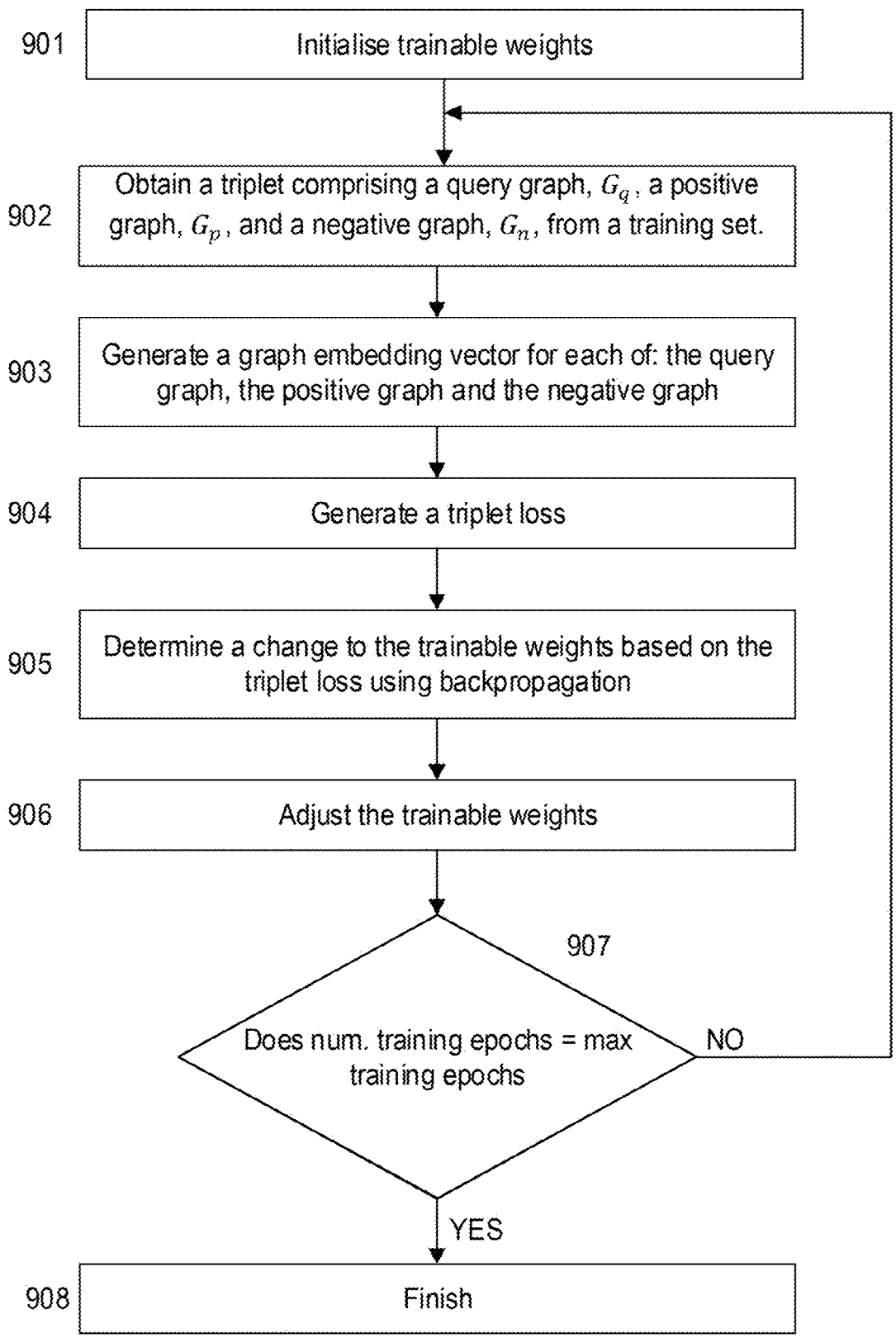
Figure 10:
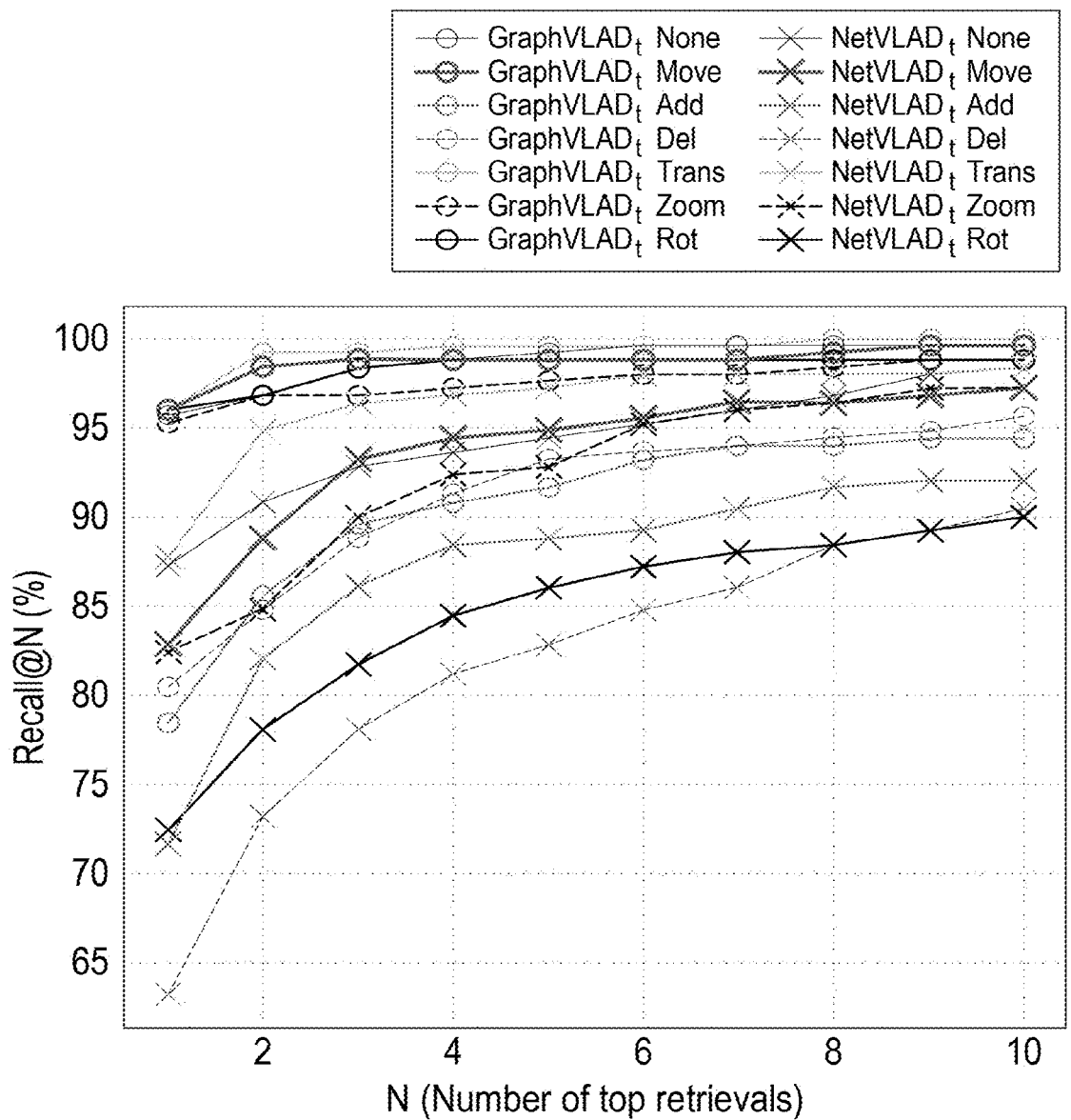
Figure 11:
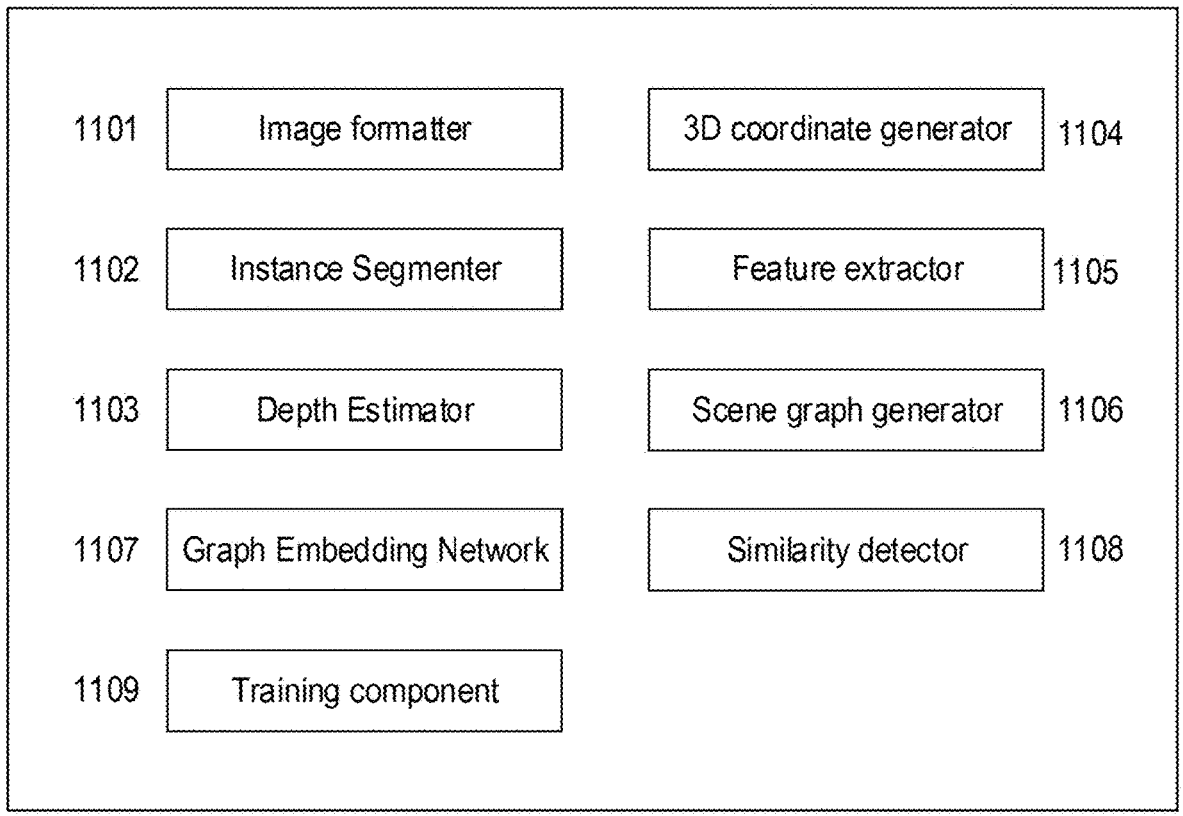
Figure 12:
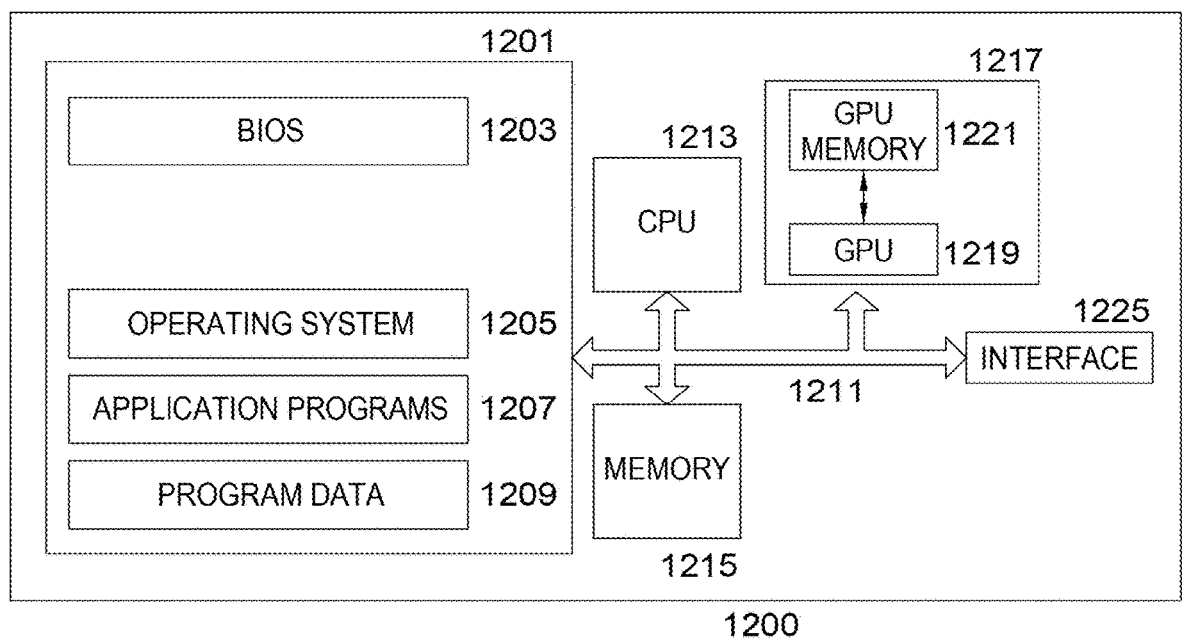

Arrangements will be understood and appreciated more fully from the following detailed description, made by way of example only and taken in conjunction with drawings in which:

FIG. 1A shows a robot 100 according to an example;
FIG. 1B shows an example use-case of visual place recognition;
FIG. 2 shows a method of visual place recognition according to an embodiment;
FIG. 3 shows an implementation of instance segmentation using 'Mask R-CNN' according to an example;
FIG. 4 shows a method for generating a set of detections according to an example;
FIG. 5A shows an example of a equirectangular image;
FIG. 5B shows a visual representation of instance segmentation generated according to an embodiment;
FIG. 5C shows a visual representation of the depth information generated according to an embodiment;
FIG. 6A shows a 3D representation of a scene with nodes and edges superimposed according to an embodiment;
FIG. 6B shows a 2D visualisation of the scene graph according to an example;
FIG. 7 shows a graph embedding network according to an embodiment;
FIG. 8 shows a method performed by the propagation layer 703 of the graph embedding network 701 according to an embodiment;
FIG. 9 shows a method of training the graph embedding network according to an embodiment;
FIG. 10 shows the recalls of 'GraphVLADt' according to an embodiment and 'NetVLADt' on the 'OmniClevr' data set for each validation type;
FIG. 11 shows a system according to an embodiment;
FIG. 12 shows a schematic of the hardware that can be used to implement methods in accordance with embodiments.

DETAILED DESCRIPTION

According to a first aspect there is provided a computer-implemented method for place recognition. The method comprising: obtaining information identifying an image of a first scene; identifying a plurality of pixel clusters in the information identifying the image, the plurality of pixel clusters comprising: a first pixel cluster; and a second pixel cluster; generating a set of feature vectors from the information identifying the image, the set of feature vectors comprising: a first feature vector associated with the first pixel cluster; and a second feature vector associated with the second pixel cluster; generating a graph of the scene, the graph comprising: a first node representing the first pixel cluster, the first node associated with the first feature vector; and a second node representing the second pixel cluster, the second node associated with the second feature vector; adding a first edge between the first node and the second node in response to determining that a first property associated with the first pixel cluster is similar to a second property associated with the second pixel cluster; generating a vector representation of the graph; calculating a measure of similarity between the vector representation of the graph and a reference vector representation, wherein the reference vector representation is associated with a second scene; and determining that the first scene and the second scene are associated with a same place in response to determining that the measure of similarity is less than a threshold.

In an embodiment a pixel cluster is a group of pixels.

In an embodiment identifying a plurality of pixel clusters comprises identifying a plurality of object instances and wherein the first pixel cluster corresponds to a first object instance and a second pixel cluster corresponds to a second object instance.

In an embodiment identifying a plurality of object instances in the information identifying the image comprises using a machine learning model trained on equirectangular images to identify the plurality of object instances.

In an embodiment an object instance is an occurrence of the object, and the object is a physical object.

In an embodiment a feature vector is an n-dimensional vector of numerical features that represent a pixel cluster, optionally an object.

In an embodiment the first property is a 3D coordinate position of the first pixel cluster, the second property is a 3D coordinate position of the second pixel cluster and the first property is similar to the second property when a distance between the 3D coordinate position of the first pixel cluster and the 3D coordinate position of the second pixel cluster is less than a distance threshold.

In an embodiment determining a distance comprises determining a Euclidean distance.

In an embodiment the distance threshold is 3 metres.

In an embodiment a first pixel cluster corresponds to a first object instance, a second pixel cluster corresponds to a second object instance, the first property is a first class label associated with the first object instance, the second property is a second class label associated with the second object instance, and wherein the first property is similar to the second property when the first class label is the same as the second class label (i.e. the first object instance and the second object instance relate to the same class of object).

In an embodiment a first pixel cluster corresponds to a first object instance, a second pixel cluster corresponds to a second object instance, the first property is a first class label associated with the first object instance, the second property is a second class label associated with the second object instance respectively, and wherein the first property is similar to the second property when the first class label and the second class label belong to a first group of classes (e.g. the first property 'chair' is similar to the second property 'table' when the first group of classes comprises {'chair', 'table'}).

In an embodiment an image comprises a plurality of pixels and information identifying an image comprises RGB values form each pixel in the plurality of pixels.

In an embodiment the method further comprises: capturing the information identifying the image of the first scene using a camera, optionally by taking a photograph using the camera.

In an embodiment the image is a visual representation of the scene, the image of the scene is divided into a plurality of pixels and wherein the information identifying the image comprises a value associated with each pixel (e.g. an RGB value), where the value for each pixel is generated by taking a picture of the scene using a camera and obtaining the value by reading a sensor within the camera.

In an embodiment the method further comprises outputting an indication that a position of the first scene is the position associated with the second scene in response to determining that the measure of similarity is less than the threshold.

In an embodiment the method is performed by a robot and the method further comprises using the indication of the current position for indoor navigation.

In an embodiment a graph representation comprises a plurality of nodes and optionally a plurality of edges connecting the nodes.

In an embodiment a vector representation of the graph is a numerical vector that represents the features of the graph (i.e. the nodes, the edges, and the spatial relationship between the nodes) using numbers.

In an embodiment the graph is a graph representation of the scene.

In an embodiment the measure of similarity between the vector representation of the graph and the reference vector representation is the Euclidean distance between the two vectors.

In an embodiment the method further comprises obtaining the reference graph representation from a reference set, the reference set comprising a plurality of other reference graph representations.

In an embodiment the method further comprises calculating a measure of similarity between the vector representation of the graph and each references graph representation in the reference set, and selecting the N reference graph representations with the highest similarity as matches. Optionally, wherein N is 1 or 5.

In an embodiment a place is a location.

In an embodiment a vector representation of the graph is the same as a graph embedding vector.

In an embodiment the image comprises a plurality of pixels, the plurality of pixels comprises a first set of pixels associated with the first pixel cluster and a second set of pixels associated with the second pixel cluster, and generating the set of feature vectors comprises: generating a third feature vector associated with a first pixel in the first set of pixels; generating a fourth feature vector associated with a second pixel in the first set of pixels; and generating the first feature vector by aggregating the third feature vector and the fourth feature vector.

In an embodiment the first pixel and the second pixel are different pixels.

In an embodiment aggregating the third feature vector and the fourth feature vector comprises summing the third feature vector and the fourth feature vector.

In an embodiment wherein generating the vector representation of the graph comprises: generating a first node vector, wherein the first node vector is associated with the first node; generating a second node vector, wherein the second node vector is associated with the second node; and generating the query graph representation based on the sum of the first node vector and the second node vector.

In an embodiment the graph of the scene comprises no edges connected to the first node; and wherein: generating the first node vector comprises setting the first node vector equal to the first feature vector.

In an embodiment the second node in the graph is connected to the first node in the graph by the first edge and generating the first node vector comprises: setting the first node vector equal to the first feature vector; generating a message between the second node and the first node based on the first node vector and the second node vector; and updating the first node vector based on a value of the first node vector and the message.

In an embodiment the message is a figurative message, i.e. the message is a matrix of values.

In an embodiment the message is generated using a machine learning model.

In an embodiment setting the first node vector equal to the first feature vector, sets the first node vector's value for time t, and wherein updating the first node vector sets the first node vectors value for time t+1.

In an embodiment generating the message between the second node and the first node comprises: generating a first set of gating weights, using a first machine learning model, based on the first node vector and the second node vector; gating the first node vector by multiplying the first node vector with the first set of gating weights to form a first gated vector; generating a second set of gating weights, using a second machine learning model, based on the first node vector and the second node vector; gating the second node vector by multiplying the second node vector with the second set of gating weights to form a second gating vector; generating the message based on the sum of the first gating vector and the second gating vector. In an embodiment the multiplication is an element-wise multiplication.

In an embodiment the first machine learning model and the second machine learning model are trainable.

In an embodiment the method further comprises passing the first gating vector and the second gating vector through a sigmoid function and summing the result to generate the message.

In an embodiment the first machine learning model and the second machine learning model comprise a single linear layer.

In an embodiment the graph of the scene further comprises a third node representing a third pixel cluster, the third node associated with a third feature vector and the third node connected to the first node by a second edge; and the method further comprises: generating a third node vector, the third node vector associated with the third node; and generating a second message between the third node and the first node based on the first node vector and the third node vector by:

generating a third set of gating weights, using the first machine learning model, based on the first node vector and the third node vector; gating the first node vector by multiplying the first node vector with the third set of gating weights to form a third gated vector; generating a fourth set of gating weights, using the second machine learning model, based on the first node vector and the third node vector; gating the third node vector by multiplying the third node vector with the fourth set of gating weights to form a fourth gating vector; generating the second message based on the sum of the third gating vector and the fourth gating vector; and wherein: updating the first node vector based on the value of the first node vector and the message comprises updating the first node vector based on the value of the first node vector and a sum of the message and the second message.

In an embodiment updating the first node vector based on the value of the first node vector and the message comprises: generating a fifth set of gating weights, using a third machine learning model, based on the first node vector and the message; gating the first node vector by multiplying the first node vector with the fifth set of gating weights to form a fifth gated vector; generating a sixth set of gating weights, using a fourth machine learning model, based on the first node vector and the message; gating the message by multiplying the message with the sixth set of gating weights to form a sixth gating vector; and updating the first node vector based on the sum of the fifth gating vector and the sixth gating vector.

In an embodiment the third machine learning model and the fourth machine learning model comprise a single linear layer.

In an embodiment generating the query graph representation based on the sum of the first node vector and the second node vector comprises: generating a seventh set of gating weights, using a fifth machine learning model, based on the first node vector; generating a first node representation of the first node vector, using a sixth machine learning model, based on the first node vector; multiplying the seventh set of gating weights with the first node representation of the first node vector to obtain a final first node representation; generating a eighth set of gating weights, using the fifth machine learning model, based on the second node vector; generating a second node representation of the second node vector, using the sixth machine learning model, based on the second node vector; multiplying the eighth set of gating weights with the second node representation of the second node vector to obtain a final second node representation; and generating the query graph representation by summing the final first node representation and the final second node representation. In an embodiment the fifth machine learning model and the sixth machine learning model comprise a single linear layer.

In an embodiment the fifth machine learning model and the sixth machine learning models implement row kernels such that the final first node representation and the final second node representation each comprise a matrix with a single column. In an embodiment generating the query graph representation comprises: determining a sum of the final first node representation and the final second node representation; and reducing a dimensionality of the sum to form the query graph representation.

In an embodiment reducing the dimensionality of the sum comprises using a Principal Component Analysis.

In an embodiment the principal component analysis is implemented using a seventh machine learning model.

In an embodiment generating the first node vector further comprises: incrementing a time value in response to updating the first node vector; determining whether the time value is less than a time threshold; and in response to determining that the time value is less than the time threshold: regenerating the message between the second node and the first node based on the first node vector and the second node vector; and updating the first node vector based on the value of the first node vector and the message.

In an embodiment the method further comprises, in response to determining that the time value is equal to the time threshold: generating the query graph representation based on the sum of the first node vector and the second node vector.

In an embodiment the image is an equirectangular image.

In an embodiment an equirectangular image is an image that spans 360 degrees horizontally and 180 degrees vertically.

In an embodiment the equirectangular image is an equirectangular projection of an input image.

In an embodiment the input image is an omnidirectional image.

In an embodiment the omnidirectional image is obtained from an omnidirectional camera.

In an embodiment identifying the plurality of pixel clusters in the information identifying the image comprises: generating a first set of detections by performing instance segmentation on the image, the first set of detections comprising the first pixel cluster; rotating the image to form a rotated image; generating a second set of detections by performing instance segmentation on the rotated image, the second set of detections comprising the second pixel cluster; and combining the first set of detections and the second set of detections to form the plurality of pixel clusters.

In an embodiment identifying the plurality of pixel clusters comprises identifying a plurality of object instances, the first pixel cluster corresponds to a first object instance and wherein the first set of detections comprises a first objectness score associated with the first object instance (and equivalently the first pixel cluster) and combining the first set of detections comprises determining whether the first objectness score is greater than an objectness threshold, and in response to determining that the first objectness score is greater than the objectness threshold: adding the first pixel cluster to the plurality of pixel clusters.

In an embodiment identifying the plurality of pixel clusters comprises identifying a plurality of object instances, the first pixel cluster is a first object instance and the first set of detections comprises a first bounding box and a first objectness score associated with the first object instance and the second set of detections comprises a third object bounding box and a third objectness score associated with the first object instance and combining the first set of detections and the second set of detections comprises: forming a combined list comprising the first set of detections and the second set of detection; comparing the third objectness score with the first objectness score; adding the first object bounding box to a final list in response to determining that the first objectness score is higher than the third objectness score; generating an Intersection Over Union value based on the first object bounding box and the third object bounding box; and in response to determining that the Intersection Over Union value is greater than an IoU threshold: removing the third object instance from the combined list.

In an embodiment the image is rotated by 180 degrees around the vertical axis (i.e. in the horizontal plane).

In an embodiment the first feature vector is represented using a Vector of Locally Aggregated Descriptors.

In an embodiment generating the set of feature vectors comprises generating, using a machine learning model, the first feature vector based on the information identifying the image of the first scene.

In an embodiment the machine learning model comprises a feature extraction layer and a VLAD layer, wherein the feature extraction layer is configured to extract features from the image and the VLAD layer is configured to represent each feature as a vector of locally aggregated descriptors.

In an embodiment the feature extraction layer comprises a Convolutional Neural Network (CNN).

In an embodiment a first entry in the vector of locally aggregated descriptions indicates a vector difference (i.e. a residual) between a cluster centre and a first feature extracted by the feature extraction layer, wherein the cluster centre represents a point in the feature space.

In an embodiment the feature space comprises each possible value of a feature.

In an embodiment the cluster centre is trainable.

In an embodiment determining that the first property associated with the first pixel cluster is similar to the second property associated with the second pixel cluster comprises: determining a first set of 3-dimensional coordinates associated with the first pixel cluster; determining a second set of 3-dimensional coordinates associated with the second pixel cluster; calculating a distance between the first set of 3-dimensional coordinates and the second set of 3-dimensional coordinates; and determining that the first property is similar to the second property when the distance is less than a distance threshold.

In an embodiment the distance is the Euclidean distance.

In an embodiment determining a first set of 3-dimensional coordinates associated with the first pixel cluster comprises: estimating a depth of the first pixel cluster; and generating the first set of 3-dimensional coordinates based on the depth and the information identifying the image.

In an embodiment the first pixel cluster is associated with a first object instance and estimating the depth comprises at least one of: 1) generating the depth using a machine learning model; 2) obtaining a depth measurement of the first object instance from a sensor and assigning the depth equal to the depth measurement; or 3) obtaining the depth from the information identifying the image, wherein the information identifying the image comprises depth measurements associated with each pixel.

According to a second aspect there is provided a non-transitory computer-readable medium comprising computer program instructions which, when executed by a processor, cause the processor to carry out the method of any preceding claim.

According to a third aspect there is provided an apparatus configured to perform/implement the above methods.

According to a fourth aspect there is provided a method for training a graph matching network for place recognition, wherein the graph matching network comprises a machine learning model, the computer-implemented method comprising: obtaining a training triplet, the training triplet comprising: a query graph, a positive graph and a negative graph; generating a query vector representation of the query graph using the machine learning model; generating a positive vector representation of the positive graph using the machine learning model; generating a negative vector representation of the negative graph using the machine learning model; determining a first similarity between the query vector representation and the positive vector representation; determining a second similarity between the query vector representation and the negative vector representation; generating a triplet loss based on the first similarity and the second similarity; and training the machine learning model based on the triplet loss.

In an embodiment the query graph is associated with a first scene, the positive graph is associated with a second scene, and the negative graph is associated with a third scene and wherein the first scene and the second scene are associated with the same place, and the first scene and the third scene are associated with different places.

In an embodiment training the machine learning model based on the triplet loss comprises: determining weights of the machine learning model using backpropagation and gradient decent.

In an embodiment the triplet loss is calculated according to: $L=\mathbb{E}_{G_q,G_p,G_n}[\max\{0, d(G_q, G_p) - d(G_q, G_n) + \gamma\}]$.

According to a fifth aspect there is provided an apparatus configured to perform/implement the above method of training a graph matching network for place recognition.

According to a sixth aspect there is provided a non-transitory computer-readable medium comprising computer program instructions which, when executed by a processor, cause the processor to carry out the method of training a graph matching network for place recognition.

According to a seventh aspect there is provided an apparatus for place recognition, the apparatus configured to: obtain information identifying an image of a first scene; identify a plurality of pixel clusters in the information identifying the image, the plurality of pixel clusters comprising: a first pixel cluster; and a second pixel cluster; generate a set of feature vectors from the information identifying the image, the set of feature vectors comprising: a first feature vector associated with the first pixel cluster; and a second feature vector associated with the second pixel cluster; generate a graph of the scene, the graph comprising: a first node representing the first pixel cluster, the first node associated with the first feature vector; and a second node representing the second pixel cluster, the second node associated with the second feature vector; add a first edge between the first node and the second node in response to determining that a first property associated with the first pixel cluster is similar to a second property associated with the second pixel cluster; generate a vector representation of the graph; calculate a measure of similarity between the vector representation of the graph and a reference vector representation, wherein the reference vector representation is associated with a second scene; and determine that the first scene and the second scene are associated with a same place in response to determining that the measure of similarity is less than a threshold.

In an embodiment the image comprises a plurality of pixels, the plurality of pixels comprises a first set of pixels associated with the first pixel cluster and a second set of pixels associated with the second pixel cluster, and the apparatus is further configured, when generating the set of feature vectors, to: generate a third feature vector associated with a first pixel in the first set of pixels; generate a fourth feature vector associated with a second pixel in the first set of pixels; and generate the first feature vector by aggregating the third feature vector and the fourth feature vector. In an embodiment the apparatus is further configured, when generating the vector representation of the graph, to: generate a first node vector, wherein the first node vector is associated with the first node; generate a second node vector, wherein the second node vector is associated with the second node;

and generate the query graph representation based on the sum of the first node vector and the second node vector.

In an embodiment the second node in the graph is connected to the first node in the graph by the first edge and the apparatus is further configured, when generating the first node vector, to: set the first node vector equal to the first feature vector; generate a message between the second node and the first node based on the first node vector and the second node vector; and update the first node vector based on a value of the first node vector and the message.

In an embodiment the apparatus is further configured, when generating the message between the second node and the first node, to: generate a first set of gating weights, using a first machine learning model, based on the first node vector and the second node vector; gate the first node vector by multiplying the first node vector with the first set of gating weights to form a first gated vector; generate a second set of gating weights, using a second machine learning model, based on the first node vector and the second node vector; gate the second node vector by multiplying the second node vector with the second set of gating weights to form a second gating vector; generate the message based on the sum of the first gating vector and the second gating vector.

In an embodiment the graph of the scene further comprises a third node representing a third pixel cluster, the third node associated with a third feature vector and the third node connected to the first node by a second edge; and the apparatus is further configured to: generate a third node vector, the third node vector associated with the third node; and generate a second message between the third node and the first node based on the first node vector and the third node vector by: generating a third set of gating weights, using the first machine learning model, based on the first node vector and the third node vector; gating the first node vector by multiplying the first node vector with the third set of gating weights to form a third gated vector; generating a fourth set of gating weights, using the second machine learning model, based on the first node vector and the third node vector; gating the third node vector by multiplying the third node vector with the fourth set of gating weights to form a fourth gating vector; generating the second message based on the sum of the third gating vector and the fourth gating vector; and wherein: updating the first node vector based on the value of the first node vector and the message comprises updating the first node vector based on the value of the first node vector and a sum of the message and the second message.

In an embodiment the apparatus is further configured, when updating the first node vector based on the value of the first node vector and the message, to: generate a fifth set of gating weights, using a third machine learning model, based on the first node vector and the message; gate the first node vector by multiplying the first node vector with the fifth set of gating weights to form a fifth gated vector; generate a sixth set of gating weights, using a fourth machine learning model, based on the first node vector and the message; gate the message by multiplying the message with the sixth set of gating weights to form a sixth gating vector; and update the first node vector based on the sum of the fifth gating vector and the sixth gating vector.

In an embodiment the apparatus is further configured, when generating the query graph representation based on the sum of the first node vector and the second node vector, to: generate a seventh set of gating weights, using a fifth machine learning model, based on the first node vector; generate a first node representation of the first node vector, using a sixth machine learning model, based on the first node vector; multiply the seventh set of gating weights with the first node representation of the first node vector to obtain a final first node representation; generate an eighth set of gating weights, using the fifth machine learning model, based on the second node vector; generate a second node representation of the second node vector, using the sixth machine learning model, based on the second node vector; multiply the eighth set of gating weights with the second node representation of the second node vector to obtain a final second node representation; and generate the query graph representation by summing the final first node representation and the final second node representation. In an embodiment the fifth machine learning model and the sixth machine learning models implement row kernels such that the final first node representation and the final second node representation each comprise a matrix with a single column.

In an embodiment the apparatus is further configured, when generating the query graph representation, to: determine a sum of the final first node representation and the final second node representation; and reduce a dimensionality of the sum to form the query graph representation.

In an embodiment the apparatus is further configured, when generating the first node vector, to: increment a time value in response to updating the first node vector; determine whether the time value is less than a time threshold; and in response to determining that the time value is less than the time threshold: regenerate the message between the second node and the first node based on the first node vector and the second node vector; and update the first node vector based on the value of the first node vector and the message.

In an embodiment the image is an equirectangular image.

In an embodiment the apparatus is further configured, when identifying the plurality of pixel clusters in the information identifying the image, to: generate a first set of detections by performing instance segmentation on the image, the first set of detections comprising the first pixel cluster; rotate the image to form a rotated image; generate a second set of detections by performing instance segmentation on the rotated image, the second set of detections comprising the second pixel cluster; and combine the first set of detections and the second set of detections to form the plurality of pixel clusters.

In an embodiment the first feature vector is represented using a Vector of Locally Aggregated Descriptors.

In an embodiment the apparatus is further configured, when determining that the first property associated with the first pixel cluster is similar to the second property associated with the second pixel cluster, to: determine a first set of 3-dimensional coordinates associated with the first pixel cluster; determine a second set of 3-dimensional coordinates associated with the second pixel cluster; calculate a distance between the first set of 3-dimensional coordinates and the second set of 3-dimensional coordinates; and determine that the first property is similar to the second property when the distance is less than a distance threshold.

In an embodiment the apparatus is further configured, when determining a first set of 3-dimensional coordinates associated with the first pixel cluster, to: estimate a depth of the first pixel cluster; and generate the first set of 3-dimensional coordinates based on the depth and the information identifying the image.

According to an eighth aspect there is provided an apparatus for training a graph matching network for place recognition, wherein the graph matching network comprises a machine learning model, the apparatus configured to: obtain a training triplet, the training triplet comprising: a query graph, a positive graph and a negative graph; generate a query vector representation of the query graph using the machine learning model; generate a positive vector representation of the positive graph using the machine learning model; generate a negative vector representation of the negative graph using the machine learning model; determine a first similarity between the query vector representation and the positive vector representation; determine a second similarity between the query vector representation and the negative vector representation; generate a triplet loss based on the first similarity and the second similarity; and train the machine learning model based on the triplet loss.

In an embodiment the apparatus is further configured, when training the machine learning model based on the triplet loss, to: determine weights of the machine learning model using backpropagation and gradient decent.

In an embodiment the triplet loss is calculated according to: $L = \mathbb{E}_{G_q, G_p, G_n}[\max\{0, d(G_q, G_p) - d(G_q, G_n) + \gamma\}]$.

According to a ninth aspect there is provided a computer-implemented method for place recognition. The computer-implemented method comprising: obtaining information identifying an image of a first scene; identifying a plurality of object instances in the information identifying the image, the plurality of object instances comprising: a first object instance; and a second object instance; generating a set of feature vectors from the information identifying the image, the set of feature vectors comprising: a first feature vector associated with the first object instance; and a second feature vector associated with the second object instance; generating a graph of the scene, the graph comprising: a first node representing the first object instance, the first node associated with the first feature vector; and a second node representing the second object instance, the second node associated with the second feature vector; determining a distance between the first object instance and the second object instance and adding a first edge to the graph between the first node and the second node in response to determining that the distance is less than a distance threshold; generating a vector representation of the graph; and calculating a measure of similarity between the vector representation of the graph and a reference vector representation, wherein the reference vector representation is associated with a second scene; and determining that the first scene and the second scene are associated with a same place in response to determining that the measure of similarity is less than a second threshold.

According to a tenth aspect there is provided an apparatus for place recognition, the apparatus configured to: obtain information identifying an image of a first scene; identify a plurality of object instances in the information identifying the image, the plurality of object instances comprising: a first object instance; and a second object instance; generate a set of feature vectors from the information identifying the image, the set of feature vectors comprising: a first feature vector associated with the first object instance; and a second feature vector associated with the second object instance; generate a graph of the scene, the graph comprising: a first node representing the first object instance, the first node associated with the first feature vector; and a second node representing the second object instance, the second node associated with the second feature vector; determine a distance between the first object instance and the second object instance and adding a first edge to the graph between the first node and the second node in response to determining that the distance is less than a distance threshold; generate a vector representation of the graph; and calculate a measure of similarity between the vector representation of the graph and a reference vector representation, wherein the reference vector representation is associated with a second scene; and determine that the first scene and the second scene are associated with a same place in response to determining that the measure of similarity is less than a second threshold.

By way of introduction, an example use-case of the methods described herein is presented. Although the example use-case below relates to the autonomous navigation of robotic systems inside buildings, it is emphasised that the methods described herein may be used for different applications. For example, the method of visual place recognition described herein may be used for vehicle localization for car/drone position estimation and/or control.

FIG. 1A shows a robot 100 according to an example. The robot 100 comprises a driving means 101 such as a holonomic drive. The driving means 101 controls the movement of the robot 100, for example, as it moves around the indoor environment.

The robot 100 further comprises a wireless input/output port 102 communicatively coupled to an antenna 103 to transmit and receive signals. The input/output port 102 is configured to transmit and receive radio signals, preferably short-range radio communication signals.

The robot 100 further comprises a microprocessor 104 coupled to non-volatile memory 105. The microprocessor 104 is configured to execute instructions stored in the non-volatile memory 105. Execution of these instructions causes the robot 100 to perform some of the method steps described herein, including, but not limited to, the method of visual place recognition discussed herein.

The example robot 100 further comprises a camera 106 configured to obtain images of the robot's environment. In particular, the camera is configured to capture a picture (i.e. a visual representation) of the robot's local environment. In an example the picture comprises a plurality of pixels, each pixel is associated with data values, which can be used to generate a visual representation of the robot's local environment (e.g. Red-Green-Blue values, YUV— Chrominance and Luminance values, etc.).

FIG. 1B shows an example use-case of visual place recognition. The example method shown in FIG. 1B is discussed in the context of a robot (e.g. the robot of FIG. 1A) navigating inside a building. In this example successful navigation requires the robot to localise its position within the building so that it can determine a path to its goal. The method begins in step 150 with the robot 100 receiving a request for position information. For example the request could be generated by the robot 100 itself in response to receiving a destination goal to navigate towards.

In step 151 the robot captures a visual representation of its environment. In an example the visual representation is obtained using the camera 106 of the robot 100.

In step 152 the robot 100 performs visual place recognition using the visual representation (i.e. the image data) obtained in step 151. Visual place recognition is performed according to the methods described herein. An output of visual place recognition can include information identifying the place of the image captured in step 151. For example, the robot 100 may maintain a reference data set comprising images of the indoor environment where each image is associated with information identifying the place/location (e.g. "Building X, Floor 3, Room F"). In one example the methods of visual place recognition described herein are configured to identify an image in the reference data set that is most similar to the image captured by the robot's 100 camera 106 in step 151. Based on the matching image from the reference set, the robot 100 determines a current position.

In step 153 the robot 100 provides a response to the requestor, where the response comprises the position information obtained in step 152. In an example the requestor 100 is also the robot 100 (i.e. a different process being executed by the robot 100). In a further example, the robot 100 uses the position information received from step 153 to plot a route to a goal destination. The robot 100 subsequently navigates (e.g. by moving using the driving means 101) to the goal destination.

FIG. 2 shows a method of visual place recognition according to an embodiment. The method begins in step 201 by obtaining an equirectangular image.

In an example obtaining an equirectangular image comprises obtaining image data and generating an equirectangular image (i.e. an equirectangular projection of the image data). FIG. 5A shows an example of an equirectangular image.

Obtaining image data can take many forms. In one example obtaining image data comprises receiving information representing an omnidirectional image. Image data includes RGB values for each pixel in the image. As known in the art, an omnidirectional image is an image that covers approximately an entire sphere, or at least a full circle in the horizontal plane surrounding the image capturing device. Optionally the information representing the omnidirectional image is generated by an omnidirectional capturing device such as an omnidirectional camera. Examples of omnidirectional cameras include, but are not limited to, GoPro® Max, Insta360 and Ricoh® Theta.

In this example, after obtaining the information representing the omnidirectional image, the method further comprises converting the omnidirectional image to an equirectangular image using an equirectangular projection. As known in the art, an equirectangular image is a rectangular image (optionally with a width to height ratio of 2:1) that covers (i.e. includes image data for) 360 degrees horizontally and 180 degrees vertically.

In another example obtaining image data and generating an equirectangular image comprises obtaining a plurality of images (e.g. from a perspective camera such as a pin hole camera) and generating the equirectangular image by stitching the images together.

In another example the image data is obtained from a fish eye camera. As known in the art, a fish eye camera comprises an ultra-wide angle lens.

Although it is advantageous to generate a complete equirectangular image (i.e. an image that has image data (e.g. pixel values) associated with the full angular range of the image (e.g. 360 degrees horizontally and 180 degrees vertically)), it is emphasised that an incomplete equirectangular image may be generated in step 201 (e.g. where input image data is missing for a portion of the equirectangular image).

In another example, step 201 comprises obtaining the equirectangular image directly (e.g. from storage or as part of a received request).

The method proceeds to step 202. Step 202 comprises performing instance segmentation on the equirectangular image generated in step 201.

The method of FIG. 2 will now be discussed using a specific example where object instances are detected and used to group pixels within the image. However, it is emphasized for the avoidance of any doubt that the invention is not so limited. In particular, in a more general example pixels within the input image are grouped together to form clusters of pixels (or in other words, pixel clusters). In one example the pixel clusters represent object instances.

In an alternative example the pixels within the image are grouped together using a criteria other than being associated with an object as the term would generally be understood by a human (i.e. a material that can be seen and touched).

In the specific example discussed below, performing instance segmentation comprises identifying instances of objects within the image and identifying the pixels of the equirectangular image that are associated with each identified object instance. As will be discussed in more detail below, classes (i.e. types) of objects identified by the image segmentation component can include: "bookcase", "chair", "door", "table", etc. FIG. 5B shows a visual representation of instance segmentation generated according to an embodiment.

In one example instance segmentation is performed using an instance segmentation component. The instance segmentation component is configured to: receive information identifying an image (e.g. RGB values) and output information identifying each instance of an object detected in the input image in addition to an object mask associated with the detected object instance (i.e. an indication of which pixels in the input image correspond to the identified object instance).

Optionally, the instance segmentation component is configured to generate information identifying each object instance and an object mask using a machine learning model. In one example the input image is an equirectangular image. In this case, the machine learning model is trained, based on equirectangular images, to detect object instances and their associated object masks.

In another example instance segmentation is performed according to 'Mask R-CNN' as described in: "K. He, G. Gkioxari, P. Dollár and R. Girshick, "Mask R-CNN," 2017 IEEE International Conference on Computer Vision (ICCV), 2017, pp. 2980-2988, doi: 10.1109/ICCV.2017.322", which is incorporated herein by reference.

Although 'Mask R-CNN' is discussed in detail in the following example it is emphasized, for the avoidance of any doubt, that other approaches to instance level segmentation could be used instead. For example, "Associate Embedding" as described in "Alejandro Newell, Zhiao Huang, & Jia Deng. (2017). Associative Embedding: End-to-End Learning for Joint Detection and Grouping, https://arxiv.org/abs/1611.05424", which is incorporated herein by reference, could instead be used to cluster pixels into different instances. Another example approach that could be used for instance level segmentation includes "Discriminate Loss" as described in "Bert De Brabandere, Davy Neven, & Luc Van Goa (2017). Semantic Instance Segmentation with a Discriminative Loss Function, https://arxiv.org/abs/1708.02551", which is incorporated herein by reference.

As known in the art, an image can be segmented using instance level segmentation or semantic segmentation. In brief, semantic segmentation associates every pixel with a class label (e.g. "table"). In contract, instance segmentation treats multiple objects of the same class as distinct individual objects (e.g. first "table", second "table", etc.). Instance segmentation is used in the methods herein in order to properly capture the geometric information in the scene (i.e. the relationship between the objects, even where the objects may be of the same class).

In brief, 'Mask R-CNN' is a technique that uses a region-based Convolutional Neural Network (CNN) that is configured to take, as an input, a representation of an image, and is configured to identify objects and generate, for each candidate object: a class label, information identifying an object bounding box, and an object mask.

As known in the art, an object mask identifies an object's spatial layout and comprises information identifying which pixels in an image (or a part thereof e.g. which pixels within the object bounding box) are associated with the identified object.

Example class labels of objects identified by 'Mask R-CNN' trained according to examples disclosed herein include, but are not limited to: 'beam', 'board', 'bookcase', 'ceiling', 'chair', 'door', 'floor', 'table', 'wall', 'window' and 'unknown'.

FIG. 3 shows an implementation of instance segmentation using 'Mask R-CNN' according to an example. In step 301 candidate object bounding boxes (also referred to as 'Regions of Interest') and an associated objectness score are generated.

'Mask R-CNN' comprises two stages. The first stage (step 301) is a Region Proposal Network (RPN) that is configured to propose candidate object bounding boxes (also referred to as Regions of Interest). The Region Proposal Network (RPN) is implemented using a fully convolutional network, taking an image as the input and generating, as an output, candidate object bounding boxes and an associated objectness confidence score (i.e. a measure of confidence that the candidate object bounding box belongs to a set of object classes as opposed to background). An implementation of the Region Proposal Network (RPN) is described in "S. Ren, K. He, R. Girshick, and J. Sun. Faster R-CNN: Towards real-time object detection with region proposal networks. In NIPS, 2015", which is incorporated herein by reference.

In step 302 a class label is generated for each Region of Interest (RoI). In step 303 an object mask is generated for each Region of Interest (RoI).

Using the two-stage analogy above; the second stage comprises identifying, for each identified Region of Interest (RoI), a class label and a bounding box offset. The second stage further comprises, generating in parallel, an object mask for each Region of Interest (RoI).

'Mask R-CNN' uses a 'RoIAlign' layer to extract features from each candidate object bounding box in a way that minimises misalignments between the Region of Interest (RoI) and the feature map. An implementation of the 'RoIAlign' layer is provided in "Mask R-CNN, 2017 IEEE International Conference on Computer Vision (ICCV), 2017, pp. 2980-2988, doi: 10.1109/ICCV.2017.322", which is incorporated herein by reference.

The second stage of 'Mask R-CNN' comprises extracting features from the image data associated with each candidate object bounding box using 'RoIAlign' and performing classification and object bounding box regression on the extracted features. An implementation of the classification and bounding-box regression is provided in "Mask R-CNN, 2017 IEEE International Conference on Computer Vision (ICCV), 2017, pp. 2980-2988, doi: 10.1109/ICCV.2017.322" referencing "R. Girshick, "Fast R-CNN," 2015 IEEE International Conference on Computer Vision (ICCV), 2015, pp. 1440-1448, doi: 10.1109/ICCV.2015.169", which is also incorporated herein by reference.

In parallel to the classification and object bounding box regression, the second stage of 'Mask R-CNN' also predicts, based on an output of the 'RoIAlign' layer, an object mask for each identified Region of Interest (RoI) (i.e. step 303). In an embodiment the 'Mask R-CNN' generates object masks for each Region of Interest (RoI) using a fully convolutional network. As known in the art, a fully convolutional network includes an (artificial) neural network that only performs convolution and deconvolution (in addition to pooling). Put in other words, a fully convolutional network does not include any fully connected layers as in a convolutional neural network. The object masks generated for each Region of Interest (RoI) identify the pixels of the image that are associated with the instance of the object.

In an example the fully convolutional network is implemented as described in 'Mask R-CNN' which references "J. Long, E. Shelhamer, and T. Darrell. Fully convolutional networks for semantic segmentation. In CVPR, 2015", which is also incorporated herein by reference.

Various pre-trained models exist for 'Mask R-CNN'. However these model have been trained on datasets comprising planar images (e.g. trained based on the 'COCO' dataset as described in "Tsung-Yi Lin, Michael Maire, Serge Belongie, James Hays, Pietro Perona, Deva Ramanan, Piotr Dollar,' and C. Lawrence Zitnick. Microsoft coco: Common objects in context. In ECCV, pages 740-755, 2014"). It was found that using a machine learning model trained on planar images produces unstable segmentation results for equirectangular images.

In an example 'Mask R-CNN' is trained for image segmentation using a training set comprising equirectangular images. An example training set for this purpose comprises at least part of the 'Stanford-2D3DS' data set as described in "Iro Armeni, Sasha Sax, Amir R. Zamir, and Silvio Savarese. (2017). Joint 2D-3D-Semantic Data for Indoor Scene Understanding", which is incorporated herein by reference.

The 'Stanford-2D3DS' data set comprises equirectangular images and associated semantically segmented images. The 'Stanford-2D3DS' data set uses 13 object classes, these being: "ceiling", "floor", "wall", "beam", "column", "window", "door", "table", "chair", "sofa", "bookcase", "board" and "clutter" (also referred to as "unknown"). Consequently, a machine learning model trained using the 'Stanford-2D3DS' is able to detect 13 classes of object. Although it emphasised, for the avoidance of any doubt, that different datasets with different classes could be used to train the machine learning model. An example of training 'Mask R-CNN' is described in in "Mask R-CNN, 2017 IEEE International Conference on Computer Vision (ICCV), 2017, pp. 2980-2988, doi: 10.1109/ICCV.2017.322", which is incorporated herein by reference.

In step 304, a set of detections is generated. In an example the set of detections comprises a class label for each identified object instance, an associated object mask, an associated objectness score, and an associated object bounding box.

Summarising the above, 'Mask R-CNN' is configured to receive information identifying an image (e.g. RGB pixel values) as an input and is configured to output a candidate object bounding box identifying a Region of Interest (RoI), a class label identifying the class that the detected object instance belongs to, an object mask identifying the pixels of the input image that are associated with the identified object instance and an objectness confidence score associated with the candidate bounding box.

As discussed above, an omnidirectional image spans 360 degrees around the horizontal plane. However, an equirectangular projection of an omnidirectional image creates a discontinuity in the scene (e.g. along the Y latitude axis, or in other words at the vertical edges of the equirectangular image). This discontinuity could reduce the accuracy of instance segmentation and lead to some object instances being undetected.

In light of this an approach is described below that reduces the effect of this discontinuity when segmenting equirectangular images. Although the following example is presented using the output of 'Mask R-CNN' it will be appreciated that the following approach could be used with the output of any image segmentation technique provided the output comprises candidate object bounding boxes and an associated objectness confidence score.

FIG. 4 shows a method for generating a set of detections according to an example. In an example performing instance segmentation comprises generating two sets of detections. A set of detections comprises an object bounding box identifying a Region of Interest (RoI) and an objectness confidence score associated with the object bounding box. The set of detections also comprises a class label identifying the class that the detected object instance belongs to and an object mask identifying the pixels of the input image that are associated with the identified object instance.

Step 401 comprises generating a first set of detections by performing instance segmentation on an "original" equirectangular projection of the input image.

In step 402 the input image is rotated around the vertical axis. Following rotation a second set of detections is generated in step 403, based on the rotated version of the "original" equirectangular projection. In an example the "original" equirectangular projection is rotated by 180 degrees around the vertical axis (i.e. in the horizontal plane) to generate the rotated version of the original equirectangular projection. Rotation by other angles are also possible provided that, in general, a discontinuity in an object in the "original" projection would not occur in the rotated version.

The first set of projections and the second set of projections are compared to generate a final set of detections. In step 404 a final set of detections is generated by filtering the first set of the detections and the second set of detections using Non-Maximum Suppression (NMS).

As known in the art, Non-Maximum Suppression (NMS) is a technique for filtering the predictions of object detectors. Filtering the detections using Non-Maximum Suppression (NMS) comprises generating a combined list of object bounding boxes from the first set of detections and the second set of detections. Next, an object bounding box from the combined list that is associated with the highest objectness confidence score is selected and added to a final list of object bounding boxes. The method further comprises calculating an Intersection over Union (IoU) value for the selected object bounding box and each remaining object bounding box in the combined list. In one example the Intersection over Union (IoU) value is calculated by determining the number of pixels that are common to each object bounding box being compared and dividing this by the number of pixels covered by the union of the object bounding boxes being compared. If the Intersection over Union (IoU) is greater than a first threshold, then the object bounding box (from the combined list) being used in the comparison is removed from the combined list. The method repeats by selecting a new object bounding box from the combined list that is associated with a highest objectness confidence score, adding this candidate to the final list and eliminating remaining object bounding boxes from the combined list that have an Intersection over Union (IoU) value greater than the first threshold. The first threshold is also referred to as the Intersection over Union (IoU) threshold. In an embodiment the Intersection over Union threshold is set to 0.5.

Optionally the first set of detections and the second set of detections are filtered before forming the combined list of object bounding boxes such that only object bounding boxes associated with an objectness confidence score greater than a second threshold are added to the combined list for subsequent filtering by Non-Maximum Suppression (NMS). In an example the second threshold (also referred to as the objectness confidence threshold) is an objectness confidence score greater than or equal to 0.7.

The object bounding boxes in the final list are each associated with an object mask and a class label. These are the same object mask and class labels that were associated with the object bounding box in the first/second set of detections.

Step 405 comprises outputting the final set of detections.

The output of the instance segmentation (i.e. the output of step 202) is then generated based on the final list of detections. As a reminder, the output of instance segmentation comprises output information identifying each object instance detected in the input image and an object mask associated with the detected object instance (i.e. an indication of which pixels in the input image correspond to the identified object instance).

In another example the output of the instance segmentation in step 202 is generated based on the first set of detections alone (i.e. without generating a second set of detections based on a rotated version of the "original" image as described in relation to FIG. 4).

Returning to FIG. 2. In step 203 the method obtains depth information. As will become more apparent from the description below, extracting camera invariant relationships between objects is achieved, in part, by lifted input images into 3D geometry. If the depth of a pixel is known it is possible to generate a 3D scene based on a 2D equirectangular input image. In light of this, step 203 comprises obtaining depth information for the pixels of the 2D equirectangular input image. FIG. 5C shows a visual representation of the depth information generated according to an embodiment.

Depth information can be obtained in a number of ways. In one example depth information of the scene is obtained using LiDAR (Light Detection and Ranging). In another example, the depth information is obtained directly from the image data obtained in step 201. In particular, where the image data comprises depth information (e.g. the image data is provided in RGBD (Red, Green, Blue, Depth) format) the depth information in step 203 is obtained directly from the image data obtained in step 201. In an example the information obtained in step 201 is captured by a RGBD-camera.

In another example depth information is obtained by generating depth maps (i.e. a representation of the input image where each pixel is associated with a depth value) from the equirectangular projection of the input image (i.e. without being provided with explicit depth data).

Optionally depth maps are generated using a machine learning model. An example machine learning model is RectNet as described in "Nikolaos Zioulis, Antonis Karakottas, Dimitrios Zarpalas, and Petros Daras. Omnidepth: Dense depth estimation for in-doors spherical panoramas. In ECCV, pages 448-465, 2018", which is incorporated herein by reference.

In brief, RectNet is a Convolutional Neural Network (CNN) architecture that follows the autoencoder structure in which an encoder encodes the input by progressively decreasing its spatial dimensions to a representation of smaller size and a decoder regresses to the desired output by upscaling the representation. The various layers of RectNet have been designed for generating depth maps from 360 degree images.

In an example the input to RectNet is the equirectangular image generated in step 201 and the output of RectNet is a depth map associating each pixel in the equirectangular input image with a depth value.

In a further example the machine learning model, specifically RectNet, is trained on at least part of the 'Stanford-2D3DS' data set which comprises an input image and an associate depth map. Optionally the equirectangular image is scaled to 512×256 pixels before being provided as an input to RectNet.

Although obtaining depth information from image data was discussed above in relation to RectNet, it will be appreciated that any technique for generating depth maps from equirectangular projections could be used instead.

Returning to FIG. 2, in step 204 the method generates a 3D location of each pixel in the equirectangular image using the depth map generated in step 203.

In one example the pixel locations of the equirectangular image are first converted to spherical coordinates. As known in the art, a spherical coordinate system is a coordinate system for three-dimensional space where the position of a point is specified by a radial distance ($\rho$), an azimuth angle ($\theta$) and a polar angle ($\varphi$). Pixel locations of the equirectangular image are converted to an azimuth angle ($\theta$) and a polar angle ($\varphi$) using a first transform. In an example where: an equirectangular image comprises W×H pixels, each pixel has an image coordinate (x,y), and the origin is the centre of the image, then: $\theta=2\pi x/W$ and $\varphi=\pi y/H$.

The depth information obtained in step 203 is used to determine a radial distance ($\rho$) for each pixel. As a result, each pixel is associated with a complete spherical coordinate. The spherical coordinates are then converted to Cartesian coordinates using a second transform (e.g. $x=\rho \cos \varphi \sin \theta$, $y=\rho \sin \varphi \sin \theta$, $z=\rho \cos \theta$).

Although a specific example is provided above, it will be appreciated that any method for converting pixels of an equirectangular image to 3D (Cartesian) coordinates could be used instead. In another example 3D Cartesian coordinates are generated as described in "3D Geometry for Panorama, Jianxiong Xiao, Massachusetts Institute of Technology", which is incorporated herein by reference.

In step 205, the method extracts features from the equirectangular projection of the input image. As known in the art, feature extraction is a core component of the computer vision pipeline and involves extracting useful features from an image which clearly define the objects in the image. In computer vision, a feature is a measurable piece of data that can be used to identify an object. For example, a feature may be a distinct color in an image or a specific shape such as a line, edge, or an image segment.

Step 205 comprises extracting features for each pixel in the equirectangular image, optionally using a machine learning model. Although feature extraction is discussed in detail in relation to 'NetVLAD' it is noted, for the avoidance of doubt, that other feature extraction methods could be used provided the method receives, as an input, the equirectangular image and generates, as an output, for each pixel in the equirectangular image, information identifying a feature map.

In an embodiment feature extraction and encoding is performed based on 'NetVLAD' as described in "Relja Arandjelovic, Petr Gronat, Akihiko Torii, Tomas Pa-jdla, and Josef Sivic. Netvlad: Cnn architecture for weakly supervised place recognition", which is incorporated herein by reference. Advantageously, 'NetVLAD', has been trained for place recognition and has been shown to perform well.

'NetVLAD' comprises a Convolutional Neural Network (for feature extraction) and a trainable VLAD layer that is amenable to training via backpropagation in order to mimic VLAD in a Convolutional Neural Network (CNN) framework.

VLAD stands for Vector of Locally Aggregated Descriptions (VLAD) and is described in "H. J'egou, M. Douze, C. Schmid, and P. P'erez. Aggregating local descriptors into a compact image representation. In Proc. CVPR, 2010" which is incorporated herein by reference. In brief, VLAD provides a descriptor pooling method where residuals (difference vector between the descriptor of the feature and cluster centres of the feature space) are generated. Formally, given N D-dimensional local image descriptors $\{x_i\}$ as input (e.g. from previous feature extraction steps), and K cluster centres ("visual words") $\{c_k\}$ as VLAD parameters, the output VLAD image representation, V, is a K×D dimensional matrix. The (j, k) element of V is computed as follows:

$$V(j, k) = \sum_{i=1}^{N} a_k(x_i)(x_i(j) - c_k(j))$$

Where $x_i(j)$ and $c_k(j)$ are the j-th dimensions of the i-th descriptor and the k-th cluster centre, respectively and $a_k(x_i)$ denotes the membership of the descriptor $x_i$ to k-th visual word, i.e. it is 1 if cluster $c_k$ is the closest cluster to descriptor $x_i$ and 0 otherwise.

'NetVLAD' modifies the weighting function ($a_k(x_i)$) such that the weight of descriptor $x_i$ to cluster $c_k$ is proportional to their proximity but relative to proximities of other cluster centres. 'NetVLAD' also introduces a parameter ($\alpha$) that controls the decay of the response with the magnitude of the distance. Furthermore, in 'NetVLAD' the cluster's anchor point (from which residuals are calculated) is trainable. In standard VLAD, the anchor is chosen as the cluster centre in order to evenly distribute the residuals across the database. However, in 'NetVLAD' the cluster centre can be trained such that the dot product between two descriptors that are known to belong to different images is small (i.e. so that the residual for different images is more different).

The VLAD descriptor used in 'NetVLAD' is:

$$V(j, k) = \sum_{i=1}^{N} \frac{e^{w_k^T x_i + b_k}}{\sum_{k'} e^{w_{k'}^T x_i + b_{k'}}} (x_i(j) - c_k(j))$$

Where $w_k=2ac_k$ and $b_k=-\alpha\|c_k\|^2$. In 'NetVLAD' $\{w_k\}$, $\{b_k\}$ and $\{c_k\}$ are trainable parameters.

Consequently, given N D-dimension local pixel descriptors as input, and K automatically found cluster centres, the output of 'NetVLAD' at each pixel is a K×D matrix based on the descriptor distance to each cluster center in the feature space. In 'NetVLAD' all pixel matrices are simply aggregated into a single matrix. This matrix is then flattened and used as the image embedding for image retrieval.

However, in the methods disclosed herein, instead of summing all N pixel matrices in an orderless way, the spatial structure is maintained so that instance-level and graph-level aggregation can be applied. Thus, the modified 'NetVLAD' according to examples described herein generates a H×W× K×D feature map for images of size H×W. Or put in other words, the 'NetVLAD' as modified herein outputs information identifying the VLAD descriptors associated with each pixel.

As discussed above, the implementation of 'NetVLAD' used in examples comprises a Convolutional Neural Network (CNN) for feature extraction. Optionally, the Convolutional Neural Network (CNN) is implemented with a pre-trained VGG-16 backbone as described in "K. Simonyan and A. Zisserman. Very deep convolutional networks for large-scale image recognition. In Proc. ICLR, 2015", which in incorporated herein by reference. In an embodiment the weights for the trainable VLAD layer are the same as those used in "Titus Cieslewski, Siddharth Choudhary, and Davide Scara-muzza. Data-efficien decentralized visual slam. In ICRA, pages 2466-2473. IEEE, 2018", which is incorporated herein by reference.

In an example the equirectangular image from step 201 is first upsampled to 2048×1024 pixels before being fed to the 'NetVLAD' feature extractor as an input. The output of the Convolutional Neural Network (CNN) (i.e. VGG-16) is taken when the size has reduced to 128×64, where each pixel has a descriptor 64×512.

Summarising the above. After completing steps 202, 203 & 204, and 205 the method has generated object masks indicating a class label for each pixel in the equirectangular image from 202, the 3D location of each pixel from steps 203 & 204, and information identifying a feature vector associated with each pixel from step 205.

Optionally steps 202 and 204 are each, separately, following by a resizing step where the information is resized so that the output image sizes of each step (i.e. 202, 204 and 205) are the same. For example, where feature extraction is performing using 'NetVLAD' with an output size of 128× 64, the sizes of the outputs of step 202 and 204 are also resized to 128×64 pixels. In particular, instance segmentation information and depth information is resized to match the 'NetVLAD' spatial dimensions (i.e. 128×64 in this example). Optionally, downsampling is performed using nearest neighbour downsampling. In nearest neighbour downsampling, first the coordinate of each pixel in the output map is determined. Then, for each output pixel, the pixel value of input pixel closest to this coordinate in the output map is selected as the output value.

Steps 202, 203 & 204, and 205 are shown in FIG. 2 in parallel to indicate that these operations do not necessarily depend on each other's outputs and so may be carried out in parallel. Alternatively, each branch shown in FIG. 2 could be executed serially.

In step 206 the method generates a scene graph. A scene graph G=(V,E) is represented as a set of nodes V and a set of edges E. Optionally, each node $i \in V$ is associated with a feature vector $x_i$ and each edge $(i,j) \in E$ is associated with a feature vector $x_{ij}$.

In step 206 nodes of the graph are generated. Each node in the graph is associated with an object instance detected in step 202. Each pixel associated with an object (identified from the object mask generated in step 202) is determined and the corresponding feature vectors (identified from step 205) associated with the determined pixels are aggregated through summation to determine a single feature vector for the object instance.

Each of the 3D coordinates (generated in step 204) that are associated with an object (identified from the object mask generated in step 202) are also determined. A median 3D coordinate value is generated based on the 3D coordinates of each pixel associated with the object, thereby generating a single median 3D coordinate associated with each object instance.

Consequently: each object is associated with a node, the feature vector associated with a node is the sum of feature vectors associated with each pixel of the object instance; and the node is also associated with a 3D coordinate where the 3D coordinate is median of the 3D coordinates associated with the object instance.

Edges between the nodes are subsequently constructed. In one example, an edge is added between nodes if the distance (optionally the Euclidean distance) is less than a distance threshold. No descriptor (i.e. feature vector $x_{ij}$) is associated with the identified edges. Advantageously, good performance is achieved with a distance threshold of 3 metres.

In another example edges are added between nodes based on a different criteria. In one example each node is associated with an object instance and each object instance is associated with a class label. In this case an edge is added between a first node and a second node if the object instances associated with the nodes have the same class label (e.g. an edge is added between two nodes that are associated with instances of the 'chair' class).

In a further example an edge is added between two nodes if the nodes are associated with class labels from a group of classes. For example, where the group of classes comprises {'chair', 'table'}, an edge is added between a first node associated with an object instance having a 'chair' class label and a second node associated with an object instance having a 'table' class label.

More generally, in one example, an edge is added between two nodes if their associated object instances have similar properties (e.g. similarity of labels, known related labels, 3D coordinates). In a further example an edge is generated between the nodes, based on a pairwise check of node properties.

FIG. 6A shows a 3D representation of a scene with nodes and edges superimposed according to an embodiment. FIG. 6B shows a 2D representation of the scene graph according to an example. Although, it is emphasised that the methods described herein use 3D scene graphs.

Returning to FIG. 2. Having generated a scene graph the method proceeds to step 207.

In step 207 a graph embedding is generated by translating the generated scene graph into a vector that can be used for subsequent comparisons (e.g. for image recognition). Optionally, the graph embedding is generated by a graph embedding network.

FIG. 7 shows a graph embedding network according to an embodiment. FIG. 7 shows a graph embedding network 701 that comprises an encoder 702, a propagation layer 703 and a graph aggregator 704. Although FIG. 7 shows the encoder 702, the propagation layer 703 and the graph aggregator 704 as separate components it will be appreciated that their functionality could be combined in one component.

The encoder 702 is configured to map node and edge features from the scene graph generated in step 206 to initial node and edge vectors $h_i^0$ and $e_{ij}^0$ respectively, where $h_i^0$ is the initial (i.e. time=0) node vector associated with the i-th node, where $i \in V$, V being the set of nodes that form the graph. The initial node vector $h_i^0$ is set equal to the feature vector $x_i$ associated with the i-th node (i.e. $h_i^0 = x_i$), while the edge vector $e_{ij}^0$ (representing the edge between nodes i and j) is unused.

As discussed above, each node is associated with an object in the scene (i.e. the input image), and in an example the feature vector associated with the node is the aggregation of 'NetVLAD' descriptors at each pixel associated with the object (i.e. the sum of residues of K clusters with D dimensional features as a K×D matrix). Consequently, in this example the initial node vector $h_i^0$ is a K×D matrix.

Advantageously, using 'NetVLAD' to extract per-pixel feature map results in an encoding that is already rich.

The encoder 702 communicates the initial node vector, $h_i^0$, for each node to the propagation layer 703. The functionality of the propagation layer will be discussed in relation to the node vector h for the i-th node (i.e. $h_i^0$), where i ∈ V, V being the set of nodes that form the graph. However it will be appreciated that the same functionality is applied to the other nodes in the set of nodes.

The propagation layer 703 is configured to (figuratively) pass messages between nodes of the graph along the edges connecting the nodes in order to generate a new representation of the node. As discussed above, a purpose of the graph embedding network 701 is to transform a graph representation into a vector that can be used for subsequent comparisons. As will be discussed in more detail below, the graph embedding network is trained such that two input graphs that represent similar scenes produce output vectors that are more similar than output vectors generated from two input graphs that represent dissimilar scenes. The propagation layer controls the process of transforming feature vectors associated with each node into a final node representations, which are ultimately used to generate a final graph representation.

FIG. 8 shows a method performed by the propagation layer 703 of the graph embedding network 701 according to an embodiment. In step 801 an initial node vector $h_i^0$ for node i is obtained. As discussed above, the initial node vector $h_i^0$ is outputted by the encoder 702. In an example, obtaining the initial node vector $h_i^0$ for node i comprises setting the initial node vector $h_i^0$ equal to the feature vector, $x_i$, (also referred to as the feature matrix) associated with the i-th node.

Additionally, step 801 also comprises obtaining information identifying the edges connecting to node i, $E_i$. In an example, information identify the edges connecting to node i is obtained from the scene graph.

In step 802 it is determined whether any edges connecting to node i exist (i.e. whether any edges (j, i) exist). If there is at least one edge connecting node i to another node then the method proceeds to step 803.

In step 803 a message, $m_{j \rightarrow i}$, is generated for each edge connecting to node i according to:

$m_{j \rightarrow i} = f_m(h_i^t, h_j^t)$; and $f_m(h_i^t, h_j^t) = \sigma(MLP_{gate}^{m,i}(h_i^t, h_j^t)) \odot \sigma(MLP_{gate}^{m,j}(h_i^t, h_j^t)) \odot h_j^t$ Where:
σ(x) is the logistic sigmoid function $$\sigma(x) = \frac{1}{1+e^{-x}};$$

$MLP_{gate}$ (x) is a multilayer perceptron configured to generate gating weights based on the input x; and
⊙ is an element-wise multiplication.

As will be apparent from the equation above, $f_m$ (also referred to as the message function) uses a sum of gating functions. As known in the art, a gating function is configured to control what proportion of the input is outputted. This is achieved by element-wise multiplication of the gating weights (e.g. $\sigma(MLP_{gate}^{m,i}(h_i^t, h_j^t))$, which range between 0 and 1) with the node vector $h_i^t$. The gating weights are generated by a machine learning model based on an input. In the example above the gating weights are generated by a multilayer perceptron based on the input ($h_i^t$, $h_j^t$), where $h_i^t$ is the current node vector for the i-th node and $h_j^t$ is the current node vector for the j-th node.

$MLP_{gate}^{m,i}$ represents a multilayer perceptron that generates gating weights for gating the node vector from the i-th node, during the process of generating a message (hence m). The multilayer perceptron has trainable weights in order to generate the gating weights (at the output) based on an input of the $h_i^t$ is the current node vector for the i-th node and $h_j^t$ is the current node vector for the j-th node. Similarly $MLP_{gate}^{m,j}$ also has trainable weights.

Advantageously, by gating the representations for each node vector and by learning how to apply the gating, the message function activates more reliable features.

In step 803 a message is generated for each edge connecting to the i-th node. For example, in the case where the i-th node is connected by an edge to two other nodes, $j_1$ and $j_2$, two messages are calculated according to: $m_{j_1 \rightarrow i} = f_m(h_i^t, h_{j_1}^t)$ and $m_{j_2 \rightarrow i} = f_m(h_i^t, h_{j_2}^t)$. However, the weights of the multilayer perceptron weights in $f_m$ are the same irrespective of the node (i.e. the learnable weights of $MLP_{gate}^{m,j}$ do not vary by j). Consequently, in this example, the same $MLP_{gate}^{m,j}$ is used for both $m_{j_1 \rightarrow i}$ and $m_{j_2 \rightarrow i}$. It will of course be appreciated that the gating weights produced by $MLP_{gate}^{m,j}$ (i.e. the output) may be different because the inputs to $MLP_{gate}^{m,j}$ will be different.

After generating messages for each edge connecting to the i-th node, the method proceeds to step 804. In step 804 an updated node vector is generated according to:

$$h_i^{t+1} = f_n\left(h_i^t, \frac{1}{\|E_i\|} \sum_{(j,i) \in E_i} m_{j \rightarrow i}\right);$$

Where $E_i \subset E$, and contains all edges (j, i) connecting to the i-th node where E is the set of edges in the scene graph and $\|E_i\|$ is the cardinality of $E_i$ (i.e. the number of edges connecting to node i). As will be apparent from the above, the node function $f_n$ takes, as a parameter, the sum of the messages generated in step 803.

The node function, $f_n$, is similar to the message function, $f_m$, apart from using different multilayer perceptrons to generate the gating weights (i.e. $MLP_{gate}^{n,i}$ and $MLP_{gate}^{n,j}$ instead of $MLP_{gate}^{m,j}$ and $MLP_{gate}^{m,j}$). The node function, $f_n$, is given by:

$f_n(h_i^t, \alpha) = \sigma(MLP_{gate}^{n,i}(h_i^t, \alpha)) \odot h_i^t + \sigma(MLP_{gate}^{n,j}(h_i^t, \alpha)) \odot \alpha$ Both $MLP_{gate}^{n,i}$ and $MLP_{gate}^{n,j}$ have learnable weights.

After generating an updated node vector (i.e. $h_i^{t+1}$) the method proceeds to step 805 where it is determined whether the time t+1 is equal to a time threshold, T. If the time does equal the time threshold, then the method proceeds to step 807 where a final node representation, $h_i^T$, is outputted by the propagation layer 703. If the time t+1 does not equal the time threshold (i.e. the time is less than the time threshold, T) then the method proceeds to step 808 where the time step is incremented (i.e. t=t+1) and then to step 802 where an updated node vector is calculated.

Returning to step 802. If it is determined in step 802 that there are no edges (j, i) connecting to the i-th node then the method proceeds to step 806 where the updated node vector $h_i^{t+1}$ is set equal to the current node vector $h_i^t$. The method subsequently proceeds to step 805 as discussed above.

Although FIG. 8 is shown in relation to a single node of the graph (i.e. the i-th node), it will be appreciated that the method can be adapted for generating final node representations $h_i^T$ for each node i in the graph. Namely by repeating the method shown in FIG. 8 for each node, or by adapting the step of FIG. 8 so that each operation is performed across each node i in the graph.

As discussed in relation to the message function, $f_m$, when discussing the different edges, the same multilayer perceptron (i.e. with the same weights) is used for each node, i, in the graph when generating updates across nodes. Put in other words the weights of: $MLP_{gate}^{n,i}$, and $MLP_{gate}^{m,i}$ are the same for all i, where i ∈ V.

In summary, the trainable parameters of the graph embedding network are the weights of: $MLP_{gate}^{m,i}$, $MLP_{gate}^{m,j}$, $MLP_{gate}^{n,i}$, $MLP_{gate}^{n,j}$. In an embodiment the weights of the various multilayer peceptrons referenced above are fixed over time (i.e. do not change with time, t). Advantageously using the same parameters over time reduces the amount of training required. In another embodiment the weights of the multilayer peceptrons vary over time.

Returning to FIG. 7, the propagation layer 703 is configured to output a final node representation $h_i^T$ for each node i in the graph based on the output of the propagation layer 703. In particular, the graph aggregator 704 is configured to generate a graph representation, $h_G$, based on the final node representations $h_i^T$ for each node i in the graph.

In an embodiment the graph aggregator 704 computes a graph level representation according to:

$$h_c = MPL_G\left(\sum_{i \in V} \sigma(MLP_{gate}(h_i^T)) \odot MLP_{node}(h_i^T)\right)$$

Where both $MLP_{gate}$ and $MLP_{node}$ are row kernels convoluted with features of each cluster (of the K clusters in the feature vector). $MLP_{gate}$ is a multilayer perceptron that is configured to generate gate weights as its output by convolving the input, i.e. the final representation of the i-th node, $h_i^T$, by a row kernel. Similarly $MLP_{node}$ is a multilayer perceptron that is configured to generate an output by convolving the input, i.e. the final representation of the i-th node, $h_i^T$, by a row kernel. The logistic sigmoid function is applied to the output of $MLP_{gate}$, and this output is them element wise multiplied with the output of $MLP_{node}$.

The node features (e.g. $h_i^T$) have the same dimensions as the feature vector associated with the node (i.e. $x_i$) which is K×D since it represents K clusters with D-dimensional features. Advantageously, using row kernels (e.g. 1×D matrices) means that the convolution is performed within each cluster, which helps preserve the structure in the data while the node representation is reduced to a K×1 matrix.

This operation is performed for each node i in the set of nodes V and the output for each node is summed. A Principal Component Analysis (PCA) based conversion is then applied to the sum to obtain the final compact descriptor of the scene. As known in the art, Principal Component Analysis (PCA) is a dimensionality-reduction method that is used to reduce the dimensionality of large data sets, by transforming a large set of variables into a smaller one that still contains most of the information in the large set.

In the example discussed above the PCA-based conversion is implemented using a multilayer perceptron (i.e. $MPL_G$). An example of using PCA-based conversion is described in 'NetVlad', which as discussed above is incorporated herein by reference. In an embodiment the weights of $MPL_G$ are predetermined (e.g. obtained as part of the weights of the pretrained 'NetVlad'). In this case the weights of the PCA-based conversion were generated during training of the 'NetVlad' system at the same time as the other weights were trained.

After dimensional reduction, the graph aggregator 304 outputs the graph level representation, $h_G$.

In an example at least some, optionally all, of the multilayer perceptrons discussed above (i.e.$MLP_{gate}^{m,i}$, $MLP_{gate}^{m,j}$, $MLP_{gate}^{n,i}$, $MLP_{gate}^{n,j}$, $MLP_{gate}$; and $MLP_{node}$) are implemented using a single linear layer. In a further example the multilayer peceptrons each comprise a number (e.g. 1, 2 and 3) of propagation layer.

Returning to FIG. 2, after generating a graph embedding in step 207, the method proceeds to step 208.

The method of FIG. 2 relates to inference. Consequently, the image data in step 201 may be obtained in response to receiving a query to perform place recognition and/or image retrieval on the image data.

In step 208 the method determines a Euclidean distance between the graph representation of the input image, $h_G$, generated in step 207 and a plurality of graph representations associated with images from a reference set of images.

In an example a reference set of images is maintained. The reference set of images comprises a plurality of images. Optionally each image is associated with location information. A graph embedding is obtained for each image in the reference set once the system has been trained (e.g. once the graph embedding network has been trained). This is achieved by providing the image as an input in step 201, and obtaining the output from step 207 in FIG. 2. The graph embedding associated with each image is stored as part of the reference set.

During inference, the Euclidean distance is determined between a graph embedding associated with a query image and the graph embeddings associated with each image in the reference set. The image associated with the smallest Euclidean distance between graph embeddings is selected as a matching image and provided as the output of the image retrieval. Optionally the matching image is provided to a user, e.g. in response to receiving the request that prompted step 201.

Where the system is used for place recognition the location associated with the matching image is retrieved and the location is provided to a user, thereby identifying the place associated with the input image that was received in step 201.

During inference the trainable weights of the graph embedding network 301 (i.e. the weights of $MLP_{gate}^{m,i}$, $MLP_{gate}^{m,j}$, $MLP_{gate}^{n,i}$, $MLP_{gate}^{n,j}$) are predetermined. In an embodiment inference follows training the system (which is discussed in more detail below). As a result the weights are generated during a training phase. In another embodiment the weights are precomputed (e.g. from a training phase at a different time) and provided to the system before inference (e.g. by being retrieved from storage).

Considering now training the trainable weights of the graph embedding network. Training comprises training the weights of the graph embedding network to produce vector representations where similar scenes are associated with vectors that have a greater similarity than the vector representations associated with two dissimilar scenes.

In an example where the graph embedding network is implemented as described above, training the graph embedding network comprises training learnable weights of the propagation layer 703 (i.e. the weights of $MLP_{gate}^{m,i}$, $MLP_{gate}^{m,j}$, $MLP_{gate}^{n,i}$, $MLP_{gate}^{n,j}$).

For the avoidance of doubt, it is emphasized that training the graph embedding network does not include training: the weights of used for feature extraction (e.g. the 'NetVLAD' parameters), the weights used for depth estimation where depth estimation is implemented with a machine learning model, and the weights used for instance segmentation. As discussed above, the weights used for each of these tasks may be predetermined and/or generated by specifically training the relevant component.

FIG. 9 shows a method of training the graph embedding network according to an embodiment. Training the graph embedding network begins in step 901 by initialising the trainable weights (i.e. the weights of $MLP_{gate}^{m,i}$, $MLP_{gate}^{m,j}$, $MLP_{gate}^{n,i}$, $MLP_{gate}^{n,j}$) Optionally the trainable weights are initialised with random values.

In step 902 the method obtains a triplet comprising a query graph, $G_q$, a positive graph, $G_p$, and a negative graph, $G_n$ from a training set. The training set comprises a plurality of triplets. A query graph is a graph representation of a scene. A positive graph is a graph representation of a similar scene (e.g. associated with the same place/location). A negative graph is a graph representation of a dissimilar scene (e.g. associated with a different place/location). The graph representations of the various scenes can be obtained by performing steps 201, 202, 203, 204, 205 and 206 on the respective images.

Optionally the graph embedding network is trained using batch training (i.e. training the graph embedding network on a subset of the larger training set). When batch training is used the triplet is obtained from the batch of training samples. In an example the number of training samples in a batch is 16.

The graph embedding network is trained using supervised learning and is configured to learn a set of weights that minimises a loss function. After obtaining a triplet from the training set the method proceeds to step 903.

In step 903 a graph embedding vector is generated for each of the query graph, $G_q$, the positive graph, $G_p$, and the negative graph, $G_n$. The graph embedding vector is generated according to step 207 of FIG. 2, using the current set weights of the graph embedding network (which, for the first training epoch are the initialised weights from step 901), thereby generating a graph embedding vector for each of the query graph, $G_q$, the positive graph, $G_p$, and the negative graph, $G_n$. For the avoidance of doubt it is emphasized that the graph embedding network uses the same trainable weights to generate vector representations of each graph.

In step 904 a triplet loss is generated based on the graph embedding vector generated for the query graph, $G_q$ (i.e. $h_{G_q}$), the graph embedding vector generated for the positive graph, $G_p$ (i.e. $h_{G_p}$) and the graph embedding vector generated for the negative graph, $G_n$ (i.e. $h_{G_n}$). In an example the training method optimises the margin-based triplet loss as described in "Florian Schroff, Dmitry Kalenichenko, and James Philbin. Facenet: A unified embedding for face recognition and clustering. In CVPR, pages 815-823, 2015", which is incorporated herein by reference.

In an example the method uses a margin-based triplet loss (i.e. a triplet loss that requires the similarity of the query graph to the positive graph to be greater than the similarity of the query graph and the negative graph by a margin) that is calculated according to:

$$L = \mathbb{E}_{G_q, G_p, G_n}[\max\{0, d(G_q, G_p) - d(G_q, G_n) + \gamma\}]$$

Where:
$d(G_q, G_p) = \|h_{G_q} - h_{G_p}\|$ and represents the square of the Euclidean distance between the graph embedding vector for the query graph, $h_{G_q}$, and the positive graph, $h_{G_p}$;
$\gamma$ is the margin and optionally set to 1.0;

$\mathbb{E}$ denotes that the triplet based loss is an expectation of the loss. In an example a set of training samples are sampled uniformly and the sum of the calculated losses are normalised by the number of samples, thereby resulting in an expectation of the loss (i.e. an average loss). A number of samples used to generate the expectation of the loss is greater than or equal to 1.

Consequently, the loss function generates a value of 0 when $d(G_q, G_p)$ is less than $d(G_q, G_n)$ by the margin $\gamma$.

After determining a triplet loss in step 904 the method proceeds to step 905.

In step 905 a change to the trainable weights (for each of the trainable weights) is determined based on the triplet loss using backpropagation.

As known in the art, backpropagation, short for "backward propagation of errors", is an algorithm for supervised learning of artificial neural networks that uses gradient descent. Given an artificial neural network and an error function, the method calculates the gradient of the error function with respect to the neural network's weights and generates a weight delta (i.e. an update value) based on a learning rate and the calculated gradient for the specific weight.

For a given trainable weight in the graph embedding network, and for a given training triplet, the method is configured to generate three adjustments. A first adjustment is based on: the differential of the loss function (L) with respect to the vector representation of the query graph ($h_{G_q}$), and the differential of the vector representation ($h_{G_q}$) with respect to the given weight (w). A second adjustment is based on: the differential of the loss function (L) with respect to the vector representation of the positive graph ($h_{G_p}$) and the differential of the vector representation ($h_{G_p}$) with respect to the given weight (w). A third adjustment is based on the differential of the loss function (L) with respect to the vector representation of the negative graph ($h_{G_n}$) and the differential of the vector representation ($h_{G_n}$) with respect to the given weight (w). The first adjustment, the second adjustment and the third adjustment can be averaged to determine a final adjustment for the given weight based on the training triplet.

The differential of the loss function with respect to the vector representations of the various graphs can be obtained by differentiating the above loss function (L). The differential of the vector representations with respect to the given weight can be determined using the chain rule and based on the structure of the graph embedding network.

Where the graph embedding network is trained using batch training it will appreciated that the adjustments for each training example are averaged across the batch to generate a final weight adjustment for the training epoch.

In step 906 each of the trainable weights are adjusted based on the determined change for each weight determined in step 905.

In an embodiment training the graph embedding network uses an Adam optimizer, optionally with a learning rate set to $10^{-4}$. As known in the art, an Adam optimizer is an optimization algorithm for stochastic gradient descent for training machine learning models. The Adam optimizer used in an example is described in: "Diederik P. Kingma, and Jimmy Ba. (2017). Adam: A Method for Stochastic Optimization", which is incorporated herein by reference.

After adjusting the trainable weights of the graph embedding network the number of training epochs performed by the training method is incremented by one (i.e. number of training epochs=number of training epochs+1) and the method proceeds to step 907.

In step 907 it is determined whether the number of training epochs that have been performed is equal to a threshold number of training epochs (max training epochs). As known in the art, a training epoch refers to a pass of the training data set (i.e. a repetition of training the machine learning model with the samples in the data set). Where batch learning is used an epoch refers to a training iteration being completed based on each of the training samples in the batch. In an embodiment the graph matching network is trained up to 1000 epochs (i.e. max training epoch=1000).

If the maximum number of epochs has not been reached the method proceeds to step 902. If the maximum number of epochs has been reached the method proceeds to step 908 where training is finished.

Optionally the weights learnt after completing the method of FIG. 9 are stored in a storage for future use in inference.

An embodiment (named 'GraphVLAD') was compared against other approaches for image retrieval/place recognition. In 'GraphVLAD' features are extracted using 'NetVLAD' with a pretrained VGG-16 backbone with the same weights are used in "Titus Cieslewski, Siddharth Choudhary, and Davide Scaramuzza. Data-efficient decentralized visual slam. In ICRA, pages 2466-2473. IEEE, 2018", which, as discussed above, is incorporated herein by reference. The outputs of instance segmentation, 3D coordinate generation, and feature extraction are resized to 128×64 pixels as required. The graph embedding network 701 is implemented in accordance with the specific example discussed above. In all evaluations the graph matching network 701 is trained with a batch size of 16 up to 1000 epochs using an Adam optimizer with the learning rate set to $10^{-4}$.

In order to evaluate 'GraphVLAD' a new data set is formed named 'OmniClevr'. 'OmniClevr' is inspired by the Clevr dataset as described in "Justin Johnson, Bharath Hariharan, Laurens VanDer Maaten, Li Fei-Fei, C Lawrence Zitnick, and Ross Girshick. Clevr: A diagnostic dataset for compositional language and elementary visual reasoning. In CVPR, pages 2901-2910, 2017", which is incorporated herein by reference. 'OmniClevr' comprises equirectangular representation of a synthetic environment with compositions of objects.

During the evaluations presented herein the ground truth instance segmentation and depth information are used (i.e. creating an embodiment where the instance segmentation and depth information components generate perfect predictions).

A comparison of the performance of 'NetVLAD' as described in "Relja Arandjelovic, Petr Gronat, Akihiko Torii, Tomas Pa-jdla, and Josef Sivic. Netvlad: Cnn architecture for weakly supervised place recognition" and 'GraphVLAD' as described herein for image retrieval is shown in the table below.

| Method | Distance (m) | Recall @ 1 | Recall @ 5 | Recall @ 10 |
| --- | --- | --- | --- | --- |
| NetVLAD | — | 73.2 | 84.6 | 90.7 |
| GraphVLAD | 0 | 90.6 | 95.9 | 97.4 |
| GraphVLAD | 1 | 90.9 | 96.5 | 97.6 |
| GraphVLAD | 3 | 92.1 | 97.1 | 98.0 |
| NetVLAD$_t$ | — | 83.2 | 94.0 | 96.3 |
| GraphVLAD$_t$ | 3 | 93.2 | 97.2 | 98.2 |

As discussed above 'GraphVLAD' generates scene graphs with 'NetVLAD' features at the nodes and edges are generated between nodes of the graph if the median 3D coordinates associated with the node are separated by less than a threshold distance d.

Results were generated for different distance thresholds (i.e. varying d). It is noted that a distance threshold for generating an edge of 3 m (i.e. d=3 m, requiring nodes to be separated by less than or equal to 3 m in order to establish an edge between the nodes) performs best.

In the above table, recalls of top N retrieved images on combined object split and camera split are reported. As known in the art, the recall is the fraction (expressed as a percentage in the above table) of times a relevant image is retrieved in the top N results. A relevant image in this case is an image from the same place/location.

'GraphVLAD' improves upon 'NetVLAD' with Recall@1 of 92.1 versus 73.2. It is noted that off-the-shelf 'NetVLAD' was pre-trained on real images, and it is not expected to perform well on the OmniClevr dataset. Therefore, 'NetVLAD' was trained on 'OmniClevr' from scratch. This instance of 'NetVLAD' trained on 'OmniClevr' from scratch is denoted as: 'NetVLAD$_t$'. Similarly, 'GraphVLAD$_t$' uses these retrained NetVLAD features for the feature extraction.

For 'NetVLAD$_t$' the Recall@1 improves to 83.2, while 'GraphVLAD$_t$' scores 93.2. It is noted that the overall performance is improved by using graphs (per se), and 'GraphVLAD$_t$' further benefits from the improved 'NetVLAD$_t$' features.

FIG. 10 shows the recalls of 'GraphVLAD$_t$' according to an embodiment and 'NetVLAD$_t$' on the 'OmniClevr' data set for each validation type. FIG. 10 shows the Receiver Operating Characteristic (ROC) curves of 'NetVLAD$_t$' and 'GraphVLAD$_t$' on the different groups of the 'OmniClevr' validation set.

Static scenes (denoted 'None') are relatively easy for image retrieval while objects dynamics such as object motion and changes pose more challenging tasks. Here, 'NetVLAD$_t$' struggles especially with addition or deletion of objects, resulting in a 71.6 and 63.2 Recall@1, respectively. In contrast, 'GraphVLAD$_t$' benefits from the graph embedding which is more robust than appearance alone, resulting in much better Recall@1 for addition and deletion of 78.4 and 80.4 respectively. Object motion is less challenging, but the methods disclosed herein still out-perform 'NetVLAD$_t$'.

Another critical factor evaluation shown in FIG. 10 is view variation due to camera motion, especially across the reference set and query set. It has been shown that 'NetVLAD$_t$' performs particularly poor for camera under roll rotation and zoom, with only 72.4 and 82.4 Recall@1, respectively. In stark contrast, 'GraphVLAD$_t$' achieves 96.0 and 95.2 Recall@1 respectively, benefiting from our rotation and translation invariant graph embedding. Similarly, translation performance is also improved for 'GraphVLAD$_t$'.

Message passing during graph similarity learning plays an important role. Specifically, in examples described herein we control context awareness through larger receptive field via the edge distance thresholds in our graphs. In the above table 'GraphVLAD' is applied (with pre-trained weights) using varying distance thresholds d. Without message passing (d=0 m) Recall@1 is reduced to 90.6, while d=1 m improves performance to 90.9. Overall, we achieve best performance with a larger set of edges, at the cost of efficiency. The best results in the above evaluations are achieved with d=3 m at 92.1 Recall@1. Thus it is believed that accumulating neighbourhood is beneficial.

Compared to 'NetVLAD$_t$', 'GraphVLAD$_t$' according to examples described herein shows its strength under challenging scene changes. In particular, the methods disclosed herein enable correct matching under camera translation and rotation. Furthermore, appearance distortion due to zooming is handled since 3D position is estimated and used in graph building. Finally, when a new object is added to the scene, the methods disclosed herein are robust against dynamics because of message passing between nearby objects.

Representing the scene as graph has further advantages. For example, representing the scene as a graph allows easier manipulation such that nodes (i.e. objects) can be added or removed from the scene graph representation of the input image.

In an example there is a method comprising modifying a scene graph (e.g. generated by step 206) to add additional nodes (associated with an additional object) and edges connecting the node to other nodes of the graph. In this way, the scene graph can be modified/augmented to include an object that was not present in the image obtained in step 201. Adding edges between nodes controls the position of the additional object within the scene. Additionally or alternatively the scene graph generated by step 206 is modified before generating a graph embedding (e.g. in step 207) to remove nodes from the graph representation. Removing nodes may be advantageous where, for example, the image data obtained in step 201 is known to include a temporary object that would likely not be present in the reference set. Consequently, by removing this node the associated object will not be taken into account when performing similarity comparisons with graph embeddings in the reference set. Optionally the modified/augmented is generated based on the output of step 206 (generating a scene graph) and provided to the input of step 207 (generating a graph embedding).

FIG. 11 shows a system according to an embodiment. FIG. 11 shows a place recognition system 1100 comprising an image formatter 1101. The image formatter 1101 is configured to implement the functionality described in relation to step 201. The place recognition system 1100 further comprises: an instance segmenter 1102 configured to implement the functionality described in relation to step 202; a depth estimator 1103 configured to implement the functionality described in relation to step 203; a 3D coordinate generator 1104 configured to implement the functionality described in relation to step 204; a feature extractor 1105 configured to implement the functionality described in relation to step 205; a scene graph generator 1106 configured to implement the functionality described in relation to step 206; an graph embedding network 1107 configured to implement the functionality described in relation to step 207. FIG. 11 also shows a similarity detector 1108 configured to implement the functionality described in relation to step 208 (i.e. determine a distance, optionally a Euclidean distance, between a generated graph embedding and a graph embedding from a reference set in order to determine a place/location). Optionally the place recognition system may further comprises a training component 1109 configured to implement the method described in relation to FIG. 9. Each of the above components are communicatively coupled to each other. Although the system is shown above as separate components it will be appreciated that the functionality of the components may be combined in a single component. Also disclosed is a system configured to implement the methods described above.

In the specific example presented above, pixels of an image were grouped according to detected object instances. However, as discussed above, the invention is not so limited. More generally, the methods herein can be used where the input image is grouped into a plurality of pixel clusters. In this case the 3D coordinate of each pixel cluster is generated as discussed above for when the pixel cluster is an object instance. Similarly, features are extracted for each pixel cluster (e.g. by summing the feature vector associated with each pixel in the pixel cluster) as discussed above for when the pixel cluster is an object instance. Similarly a scene graph is generated where each node corresponds to a pixel cluster.

FIG. 12 shows a schematic of the hardware that can be used to implement methods in accordance with embodiments. The hardware comprises a computing system 1200. In this particular example, the components of the system will be described together. However, it will be appreciated that the components are not necessarily co-located.

Components of the computing system 1200 include, but are not limited to, a processing unit 1213 (such as a Central Processing Unit, CPU, otherwise referred to as a 'processor'), a system memory 1201, a system bus 1211 that couples various system components including the system memory 1201 to the processing unit 1213. The system bus 1211 may be any of several types of bus structure including a memory bus or memory controller, a peripheral bus and a local bus using any of a variety of bus architecture etc. The computing system 1200 may also comprises a memory 1215 connected to the system bus 1211. The memory 1215 may be an external memory.

The system memory 1201 comprises computer storage media in the form of volatile/or non-volatile memory such as Read-Only Memory (ROM). The system memory 1201 stores computer-readable instructions which, when executed by the processing unit 1213 (e.g. a processor), causes the processing unit 1213 (also referred to as the 'processor') to implement the functionality described herein, in particular implementing the methods as discussed in relation to FIG. 2 (inference) and FIG. 9 (training).

The system memory 1201 may also comprise an operating system 1205, application programs 1207 and program data 1209 that are in use by the processing unit 1213. In an embodiment the system memory 1201 also comprises a Basic Input Output System (BIOS) 1203 containing routines that help transfer information between the elements within the computer, such as during start-up is typically stored in system memory 1201.

The computing system further comprises an interface 1225 that is communicatively connected to the system bus 1211. In an example the interface 1225 comprises functionality to communicate via a wired and/or wireless connection, specifically for receiving information from and transmitting information to other devices. Additionally or alternatively, the interface 1225 comprises a camera input for receiving input (e.g. images of a scene) and an output for providing place recognition/image retrieval results to a user. In another example the interface 1225 may be a user interface in various forms that allows a user to interact with the system. For example, by generating commands and/or questions and receiving responses.

In the example of FIG. 12, a video interface 1217 is provided. The video interface 1217 comprises a Graphics Processing Unit (GPU) 1219 which is communicatively connected to a graphics processing memory 1221.

Graphics Processing Unit (GPU) 1219 is particularly well suited to the training of the machine learning models, such as neural network training, due to its adaptation to data parallel operations. Therefore, in an embodiment, the processing for training the machine learning models may be divided between CPU 1213 and GPU 1219.

It should be noted that in some embodiments different hardware may be used for the training the machine learning models and for performing the state updates. For example, the training of the machine learning models may occur on one or more local desktop or workstation computers or on devices of a cloud computing system, which may include one or more discrete desktop or workstation CPUs, one or more discrete desktop or workstation CPUs, e.g. processors having a PC-oriented architecture, and a substantial amount of volatile system memory, e.g. 16 GB or more. While, for example, the performance of the machine learning model (i.e. inference) may use other hardware.

Although FIG. 12 shows a specific example of the hardware that can be used to implement the methods described herein, it will be appreciated that this is just one example and other arrangements could also be used.

As discussed above, examples presented herein can be used for image retrieval and place recognition. Example use cases include vehicle localization for robot/car/drone position estimation and/or control. Optionally the image is obtained from, and the methods are performed by a smart phone, a camera, and/or a robot. The methods disclosed herein are robust to appearance changes caused by object dynamics and camera movements. Further use cases include car, and drone mounted cameras, which are subject to varying rotations. Further the use of abstract data for training allows for easy augmentation.

While certain arrangements have been described, the arrangements have been presented by way of example only, and are not intended to limit the scope of protection. The inventive concepts described herein may be implemented in a variety of other forms. In addition, various omissions, substitutions and changes to the specific implementations described herein may be made without departing from the scope of protection defined in the following claims.

The invention claimed is:

1. A computer-implemented method for place recognition comprising:
obtaining information identifying an image of a first scene;
identifying a plurality of pixel clusters in the information identifying the image, the plurality of pixel clusters comprising: a first pixel cluster; and a second pixel cluster;
generating a set of feature vectors from the information identifying the image, the set of feature vectors comprising: a first feature vector associated with the first pixel cluster; and
a second feature vector associated with the second pixel cluster;
generating a graph of the scene, the graph comprising: a first node representing the first pixel cluster, the first node associated with the first feature vector; and a second node representing the second pixel cluster, the second node associated with the second feature vector;
adding a first edge between the first node and the second node in response to determining that a first property associated with the first pixel cluster is similar to a second property associated with the second pixel cluster;
generating a vector representation of the graph;
calculating a measure of similarity between the vector representation of the graph and a reference vector representation, wherein the reference vector representation is associated with a second scene; and
determining that the first scene and the second scene are associated with a same place in response to determining that the measure of similarity is less than a threshold.

2. The computer-implemented method according to claim 1, wherein the image comprises a plurality of pixels, the plurality of pixels comprises a first set of pixels associated with the first pixel cluster and a second set of pixels associated with the second pixel cluster, and generating the set of feature vectors comprises:
generating a third feature vector associated with a first pixel in the first set of pixels;
generating a fourth feature vector associated with a second pixel in the first set of pixels; and
generating the first feature vector by aggregating the third feature vector and the fourth feature vector.

3. The computer-implemented method according to claim 1, wherein generating the vector representation of the graph comprises:
generating a first node vector, wherein the first node vector is associated with the first node;
generating a second node vector, wherein the second node vector is associated with the second node; and
generating the query graph representation based on the sum of the first node vector and the second node vector.

4. The computer-implemented method according to claim 3, wherein the second node in the graph is connected to the first node in the graph by the first edge and generating the first node vector comprises:
setting the first node vector equal to the first feature vector;
generating a message between the second node and the first node based on the first node vector and the second node vector; and
updating the first node vector based on a value of the first node vector and the message.

5. The computer-implemented method according to claim 4, wherein generating the message between the second node and the first node comprises:
generating a first set of gating weights, using a first machine learning model, based on the first node vector and the second node vector;
gating the first node vector by multiplying the first node vector with the first set of gating weights to form a first gated vector;
generating a second set of gating weights, using a second machine learning model, based on the first node vector and the second node vector;
gating the second node vector by multiplying the second node vector with the second set of gating weights to form a second gating vector; and
generating the message based on the sum of the first gating vector and the second gating vector.

6. The computer-implemented method according to claim 5, wherein:
the graph of the scene further comprises a third node representing a third pixel cluster, the third node associated with a third feature vector and the third node connected to the first node by a second edge; and
the method further comprises:
generating a third node vector, the third node vector associated with the third node; and
generating a second message between the third node and the first node based on the first node vector and the third node vector by:
generating a third set of gating weights, using the first machine learning model, based on the first node vector and the third node vector;
gating the first node vector by multiplying the first node vector with the third set of gating weights to form a third gated vector, generating a fourth set of gating weights, using the second machine learning model, based on the first node vector and the third node vector;

gating the third node vector by multiplying the third node vector with the fourth set of gating weights to form a fourth gating vector;

generating the second message based on the sum of the third gating vector and the fourth gating vector; and wherein:

updating the first node vector based on the value of the first node vector and the message comprises:

updating the first node vector based on the value of the first node vector and a sum of the message and the second message.

7. The computer-implemented method according to claim 5, wherein updating the first node vector based on the value of the first node vector and the message comprises:

generating a fifth set of gating weights, using a third machine learning model, based on the first node vector and the message;

gating the first node vector by multiplying the first node vector with the fifth set of gating weights to form a fifth gated vector;

generating a sixth set of gating weights, using a fourth machine learning model, based on the first node vector and the message;

gating the message by multiplying the message with the sixth set of gating weights to form a sixth gating vector; and updating the first node vector based on the sum of the fifth gating vector and the sixth gating vector.

8. The computer-implemented method according to claim 3, wherein generating the query graph representation based on the sum of the first node vector and the second node vector comprises:

generating a seventh set of gating weights, using a fifth machine learning model, based on the first node vector;

generating a first node representation of the first node vector, using a sixth machine learning model, based on the first node vector;

multiplying the seventh set of gating weights with the first node representation of the first node vector to obtain a final first node representation;

generating an eighth set of gating weights, using the fifth machine learning model, based on the second node vector;

generating a second node representation of the second node vector, using the sixth machine learning model, based on the second node vector;

multiplying the eighth set of gating weights with the second node representation of the second node vector to obtain a final second node representation; and generating the query graph representation by summing the final first node representation and the final second node representation.

9. The computer-implemented method according to claim 8, wherein the fifth machine learning model and the sixth machine learning models implement row kernels such that the final first node representation and the final second node representation each comprise a matrix with a single column.

10. The computer-implemented method according to claim 8, wherein generating the query graph representation comprises:

determining a sum of the final first node representation and the final second node representation; and reducing a dimensionality of the sum to form the query graph representation.

11. The computer-implemented method according to claim 4, wherein generating the first node vector further comprises:

incrementing a time value in response to updating the first node vector;

determining whether the time value is less than a time threshold; and in response to determining that the time value is less than the time threshold:

regenerating the message between the second node and the first node based on the first node vector and the second node vector; and updating the first node vector based on the value of the first node vector and the message.

12. The computer-implemented method according to claim 1, wherein the image is an equirectangular image.

13. The computer-implemented method according to claim 12, wherein identifying the plurality of pixel clusters in the information identifying the image comprises:

generating a first set of detections by performing instance segmentation on the image, the first set of detections comprising the first pixel cluster;

rotating the image to form a rotated image;

generating a second set of detections by performing instance segmentation on the rotated image, the second set of detections comprising the second pixel cluster; and combining the first set of detections and the second set of detections to form the plurality of pixel clusters.

14. The computer-implemented method according to claim 1, wherein the first feature vector is represented using a Vector of Locally Aggregated Descriptors.

15. The computer-implemented method according to claim 1, wherein determining that the first property associated with the first pixel cluster is similar to the second property associated with the second pixel cluster comprises:

determining a first set of 3-dimensional coordinates associated with the first pixel cluster;

determining a second set of 3-dimensional coordinates associated with the second pixel cluster;

calculating a distance between the first set of 3-dimensional coordinates and the second set of 3-dimensional coordinates; and determining that the first property is similar to the second property when the distance is less than a distance threshold.

16. The computer-implemented method according to claim 15, wherein determining a first set of 3-dimensional coordinates associated with the first pixel cluster comprises:

estimating a depth of the first pixel cluster; and generating the first set of 3-dimensional coordinates based on the depth and the information identifying the image.

17. A non-transitory computer-readable medium comprising computer program instructions which, when executed by a processor, cause the processor to carry out the method of claim 1.

18. An apparatus for place recognition, the apparatus configured to:

obtain information identifying an image of a first scene;

identify a plurality of pixel clusters in the information identifying the image, the plurality of pixel clusters comprising: a first pixel cluster; and a second pixel cluster;

generate a set of feature vectors from the information identifying the image, the set of feature vectors comprising: a first feature vector associated with the first pixel cluster; and a second feature vector associated with the second pixel cluster;

generate a graph of the scene, the graph comprising: a first node representing the first pixel cluster, the first node associated with the first feature vector; and a second node representing the second pixel cluster, the second node associated with the second feature vector;

add a first edge between the first node and the second node in response to determining that a first property associated with the first pixel cluster is similar to a second property associated with the second pixel cluster;

generate a vector representation of the graph;

calculate a measure of similarity between the vector representation of the graph and a reference vector representation, wherein the reference vector representation is associated with a second scene; and determine that the first scene and the second scene are associated with a same place in response to determining that the measure of similarity is less than a threshold.

19. The apparatus according to claim 18, wherein the image comprises a plurality of pixels, the plurality of pixels comprises a first set of pixels associated with the first pixel cluster and a second set of pixels associated with the second pixel cluster, and the apparatus is further configured, when generating the set of feature vectors, to:

generate a third feature vector associated with a first pixel in the first set of pixels;

generate a fourth feature vector associated with a second pixel in the first set of pixels; and generate the first feature vector by aggregating the third feature vector and the fourth feature vector.

20. The apparatus according to claim 18, wherein the apparatus is further configured, when generating the vector representation of the graph, to:

generate a first node vector, wherein the first node vector is associated with the first node;

generate a second node vector, wherein the second node vector is associated with the second node; and generate the query graph representation based on the sum of the first node vector and the second node vector.

* * * * *